(12) United States Patent
Schäfer

(10) Patent No.: US 11,636,179 B2
(45) Date of Patent: Apr. 25, 2023

(54) APPARATUS FOR LANE DETECTION

(71) Applicant: ARRIVER SOFTWARE AB, Linkoping (SE)

(72) Inventor: Eugen Schäfer, Meisenheim (DE)

(73) Assignee: Arriver Software AB, Linköping (SE)

(*) Notice: Subject to any disclaimer, the term of this patent is extended or adjusted under 35 U.S.C. 154(b) by 379 days.

(21) Appl. No.: 16/607,920

(22) PCT Filed: May 3, 2018

(86) PCT No.: PCT/EP2018/061402
§ 371 (c)(1),
(2) Date: Oct. 24, 2019

(87) PCT Pub. No.: WO2018/206403
PCT Pub. Date: Nov. 15, 2018

(65) Prior Publication Data
US 2021/0097336 A1    Apr. 1, 2021

(30) Foreign Application Priority Data
May 9, 2017 (EP) .................................... 17170139

(51) Int. Cl.
*G06K 9/62* (2022.01)
*B60W 30/12* (2020.01)
(Continued)

(52) U.S. Cl.
CPC ....... *G06F 18/23211* (2023.01); *B60W 30/12* (2013.01); *G06V 20/588* (2022.01); *B60W 2556/20* (2020.02)

(58) Field of Classification Search
CPC ... G06K 9/6222; G06V 20/588; B60W 30/12; B60W 2556/20
See application file for complete search history.

(56) References Cited

U.S. PATENT DOCUMENTS

| 5,963,148 A | 10/1999 | Sekine et al. |
| 8,892,347 B1 | 11/2014 | Ibrahim et al. |

(Continued)

FOREIGN PATENT DOCUMENTS

| CN | 101950423 A | 1/2011 |
| CN | 101966846 A | 2/2011 |

(Continued)

OTHER PUBLICATIONS

International Search Report and Written Opinion of PCT/EP2018/061402 dated Jul. 16, 2018.

(Continued)

*Primary Examiner* — Peter D Nolan
*Assistant Examiner* — Mikko Okechukwu Obioha
(74) *Attorney, Agent, or Firm* — Arriver Software AB

(57) ABSTRACT

An apparatus for a motor vehicle driver assistance system is provided. The apparatus is configured to optimise object clusters, where each object cluster includes a sequence of position measurements for at least one object in the vicinity of the vehicle. Initially, in a pre-clustering phase, the assignment of the measured object positions to the object clusters may be based on the relative proximity of the measured object positions. The apparatus identifies a rogue object cluster on the basis of a first diagnostic, and a rogue object track from the measurements within the rogue object cluster. The position measurements from the rogue object track are removed from the clusters, and remaining position measurements in the rogue object cluster are reassigned to the other object clusters. The rogue object cluster is removed. Thus the object clusters are optimised.

20 Claims, 21 Drawing Sheets

(51) Int. Cl.
*G06V 20/56* (2022.01)
*G06F 18/23211* (2023.01)

(56) References Cited

U.S. PATENT DOCUMENTS

| | | |
|---|---|---|
| 8,954,205 B2 | 2/2015 | Ibrahim et al. |
| 9,037,404 B2 | 5/2015 | Ibrahim et al. |
| 9,127,956 B2 | 9/2015 | Einecke et al. |
| 9,261,601 B2 | 2/2016 | Ibrahim et al. |
| 9,435,654 B2 | 9/2016 | Ibrahim et al. |
| 9,559,804 B2 | 1/2017 | Ibrahim et al. |
| 9,805,592 B2 | 10/2017 | Ibrahim et al. |
| 2002/0018119 A1 | 2/2002 | Kogure et al. |
| 2010/0104199 A1 | 4/2010 | Zhang et al. |
| 2013/0173115 A1 | 7/2013 | Gunia et al. |
| 2014/0358321 A1 | 12/2014 | Ibrahim et al. |
| 2014/0358322 A1 | 12/2014 | Ibrahim et al. |
| 2014/0358324 A1 | 12/2014 | Ibrahim et al. |
| 2014/0358414 A1 | 12/2014 | Ibrahim et al. |
| 2014/0358416 A1 | 12/2014 | Ibrahim et al. |
| 2015/0025789 A1 | 1/2015 | Einecke et al. |
| 2015/0235140 A1 | 8/2015 | Rothermel |
| 2015/0325119 A1 | 11/2015 | Lehnertz |
| 2016/0036558 A1 | 2/2016 | Ibrahim et al. |
| 2016/0049079 A1 | 2/2016 | Ibrahim et al. |
| 2017/0003685 A1 | 1/2017 | Pollock |
| 2017/0031361 A1 | 2/2017 | Olson et al. |
| 2017/0322314 A1* | 11/2017 | Yang .................... G01S 5/0072 |
| 2018/0045832 A1 | 2/2018 | Ibrahim et al. |
| 2018/0150086 A1 | 5/2018 | Ibrahim et al. |
| 2018/0257660 A1 | 9/2018 | Ibrahim et al. |
| 2018/0306912 A1 | 10/2018 | Branson |
| 2019/0329763 A1* | 10/2019 | Sierra Gonzalez .. G08G 1/0962 |

FOREIGN PATENT DOCUMENTS

| | | |
|---|---|---|
| CN | 103183028 A | 7/2013 |
| CN | 104812645 A | 7/2015 |
| CN | 104812650 A | 7/2015 |
| CN | 105096593 A | 11/2015 |
| CN | 106323308 A | 1/2017 |
| CN | 106394553 A | 2/2017 |
| CN | 106428009 A | 2/2017 |
| CN | 109677406 A | 4/2019 |
| DE | 19609488 A1 | 10/1996 |
| EP | 1172665 A2 | 1/2002 |
| EP | 2 826 687 B1 | 3/2019 |
| FR | 3092545 A1 | 8/2020 |
| WO | WO 2016/090571 A1 | 6/2016 |

OTHER PUBLICATIONS

European Search Report—EP17170139—Search Authority—Munich—dated Nov. 9, 2017.

* cited by examiner

FOR CLARITY FIGURE 13 IS SPLIT BETWEEN PAGES 14/21 AND 15/21

FOR CLARITY FIGURE 13 IS SPLIT BETWEEN PAGES 14/21 AND 15/21

APPARATUS FOR LANE DETECTION

CROSS-REFERENCE TO RELATED APPLICATIONS

This application is a 35 U.S.C. § 371 national phase of PCT International Application No. PCT/EP2018/061402, filed May 3, 2018, which claims the benefit of priority under 35 U.S.C. § 119 to European Patent Application No. 17170139.4, filed May 9, 2017, the contents of which are incorporated herein by reference in their entirety.

FIELD OF THE INVENTION

The present invention relates to a driver assistance system, and more particularly an apparatus for clustering objects detected by a driver assistance system.

BACKGROUND

In order that accidents are avoided and driving laws are complied with, driving a motor vehicle requires concentration from the driver, often for prolonged periods. Lapses in concentration from the driver lead to increased risk of accidents or non-compliance with the law. Increasingly, driver assistance systems that are capable of performing an assistance function are fitted to the driver's vehicle (hereinafter referred to as the "ego vehicle"). For example, the assistance function may comprise relieving the driver of some of his/her driving duties, or may comprise monitoring the driver's performance in order that errors may be anticipated or avoided.

Alternatively, the assistance function may introduce some additional functionality not ordinarily available to a driver. Such additional functionality may allow the driver to have more information than they ordinarily would do, in order that they can perform a driving task more easily. A rear-facing camera for example, which can provide a video feed to a driver when reversing, constitutes an example of such an additional functionality. In this example, the video feed allows the driver to reverse-park more easily and safely but is not actually necessarily monitoring the driver's performance or performing some task for them.

Driver assistance systems therefore mitigate risk for the driver of the ego vehicle, his/her passengers, and other road users. Ultimately, it is thought that driver assistance functions will be developed to such an extent that they can control most, if not all, aspects of driving an ego vehicle. In this case, the driver assistance system will be an autonomous driving system.

Driver assistance systems may include active devices, which are capable of actively intervening in the operation of the ego vehicle, for example by changing the speed of the ego vehicle. Driver assistance systems may alternatively or additionally include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor may measure parameters of the vehicle or its surroundings. The data from such a sensor is processed in order to draw conclusions based on the sensor measurements. The driver assistance system may then trigger some interaction with the ego vehicle, or with the driver, based on the result of the conclusions.

Examples of potential sensors used in driver assistance systems include RADAR systems, LIDAR systems, cameras or camera, inter-vehicle communications, and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. The sensor is able to determine the distance to the vehicle ahead. The driver assistance system also monitors, and can control, the velocity of the ego vehicle. The driver assistance system controls the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

Providing a detailed and reliable situational awareness is important for a number of different driver assistance functionalities.

In the majority of driving situations, vehicles are travelling in lanes. That is, the road is split into a number of generally parallel lanes, each of which forms a corridor along which vehicles should travel. Sometimes the lanes are designated by road markings on the road surface, which visually indicate to a driver where the boundaries of the lanes are. Sometimes there are no road markings, and the driver simply has to take care not to stray into a lane of oncoming traffic. Sometimes the lane markings change along a particular section of road. For example, when work is being done to a road, the lanes may be narrowed relative to their normal configuration. Lanes may also separate from one another or come together, for example with slip roads.

In situations where the lane markings are obscured from view (for example, by snow), or where road markings are not present, it is not possible for a driver assistance system to identify the position and dimensions of the lanes by processing output data from a visible light camera, for example. Lane markings may also be obscured by other vehicles or objects, or simply the camera may not be able to distinguish visually the lane markings beyond a certain distance from the ego vehicle.

It is an object of the invention to provide an improved apparatus for a driver assistance system and method of operating an apparatus for a driver assistance system, which seeks to address some or all of these issues.

According to a first aspect of the present invention, there is provided an apparatus for a motor vehicle driver assistance system, the apparatus being operable to initialize and optimise a plurality of object clusters, each of the object clusters including at least one object track, wherein each object track includes a plurality of sequential measurements of the position of a respective object located in the vicinity of the motor vehicle, and each object track has a track length, the apparatus being configured to perform the following steps: a) assign the position measurements of the plurality of object tracks to a collection of object clusters, wherein each object cluster includes at least one position measurement from at least one of the object tracks, b) calculate a respective value of a first diagnostic for each object cluster in the collection; c) based on the values of the first diagnostic, identify a rogue object cluster; d) from the object tracks whose position measurements are assigned to the rogue object cluster, identify as a rogue object track the object track having the longest length; e) remove the sequence of position measurements corresponding to the rogue object track from all object clusters; f) reassign any remaining position measurements previously assigned to the rogue object cluster to other object clusters in the collection, and; g) remove the rogue object cluster from the collection, to thereby optimise the object clusters.

Advantageously, the apparatus is further configured to repeat steps b) to g) until no rogue object cluster is identified.

Conveniently, the apparatus is further configured to, in step b), determine whether or not each object cluster is confluent with each other object cluster.

Optionally, the apparatus is further configured to determine, for each object cluster in the collection, whether the each object cluster is an inner object cluster or an external object cluster.

Advantageously, the value of the first diagnostic for each inner object cluster is the number of other inner object clusters with which it is confluent, and; wherein the value of the first diagnostic for each external object cluster is set to zero.

Conveniently, the rogue object cluster is the object cluster having the highest unique value of the first diagnostic.

Optionally, the apparatus is further configured to, in the event that two object clusters have identical values of the first diagnostic, calculate a value for a second diagnostic for at least each object cluster having the identical value of the first diagnostic, and wherein the identification of the rogue object cluster is further based on the value of the second diagnostic.

Advantageously, the value of a second diagnostic for each object cluster is equal to the number of contacts of it with the other object clusters.

Conveniently, the rogue object cluster is identified as the object cluster having the highest unique value of the second diagnostic.

Optionally, the apparatus is further configured to, in the event that two object clusters have identical values of the second diagnostic, calculate a value for a third diagnostic for at least each object cluster having the identical value of the second diagnostic, and wherein the identification of the rogue object cluster is further based on the value of the third diagnostic.

Advantageously, a value of the third diagnostic for each object cluster is equal to the number of parallelisms of it with the other object clusters.

Conveniently, the rogue object cluster is identified as the object cluster having the lowest unique value of the third diagnostic.

According to a second aspect of the present invention, there is provided a method for a motor vehicle driver assistance system, the method for initialising and optimising a plurality of object clusters, each of the object clusters including at least one object track, wherein each object cluster includes a plurality of sequential measurements of the position of respective object located in the vicinity of the motor vehicle, and each object track has a track length, the method including the following steps: a) assign the position measurements of the plurality of object tracks among a collection of object clusters, wherein each object cluster includes at least one position measurement from at least one of the object tracks, b) calculate a respective value of a first diagnostic for each object cluster in the collection; c) based on the values of the first diagnostic, identify a rogue object cluster; d) from the object tracks whose position measurements are assigned to the rogue object cluster, identify as a rogue object track the object track having the longest length; e) remove the sequence of position measurements corresponding to the rogue object track from all object clusters; f) reassign any remaining position measurements comprised in the rogue object cluster to other object clusters in the collection, and; g) remove the rogue object cluster from the collection, to thereby optimise the object clusters.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
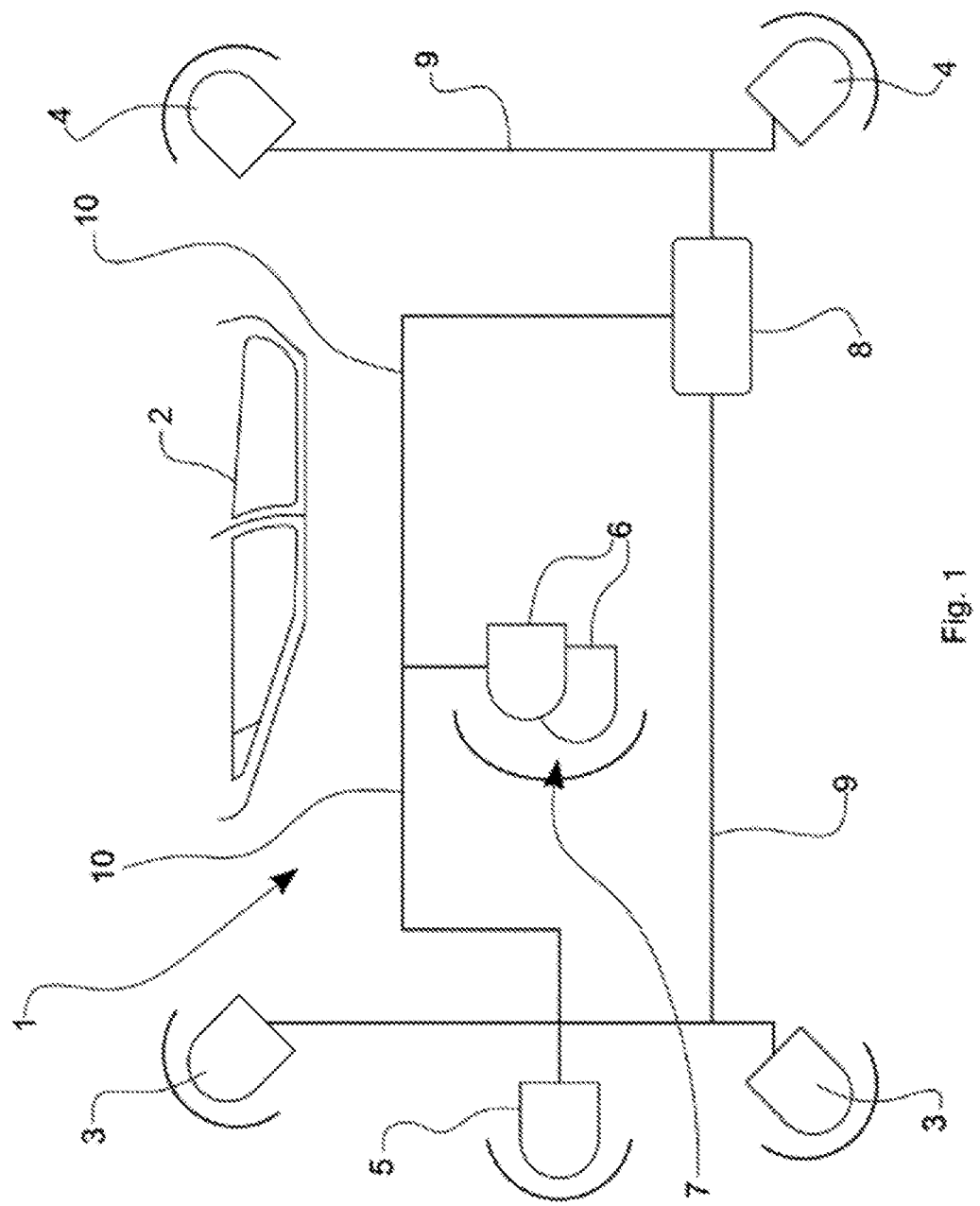
FIG. 1 shows a vehicle with a driver assistance system of a type suitable for use with the present invention.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The safety system 1 comprises a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed longrange radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 via a conventional Controller Area Network ("CAN") bus 9, and the LRR sensor 5 and the sensors of the SVS 7 are connected to the central control unit 8 via a faster FlexRay serial bus 9, also of a type known per se.

Collectively, and under the control of the control unit 8, the various sensors 3-6 can be used to provide a variety of different types of driver assistance functionalities such as, for example: blind spot monitoring; adaptive cruise control; collision prevention assist; lane departure protection; and rear collision mitigation.

Figure 2A:
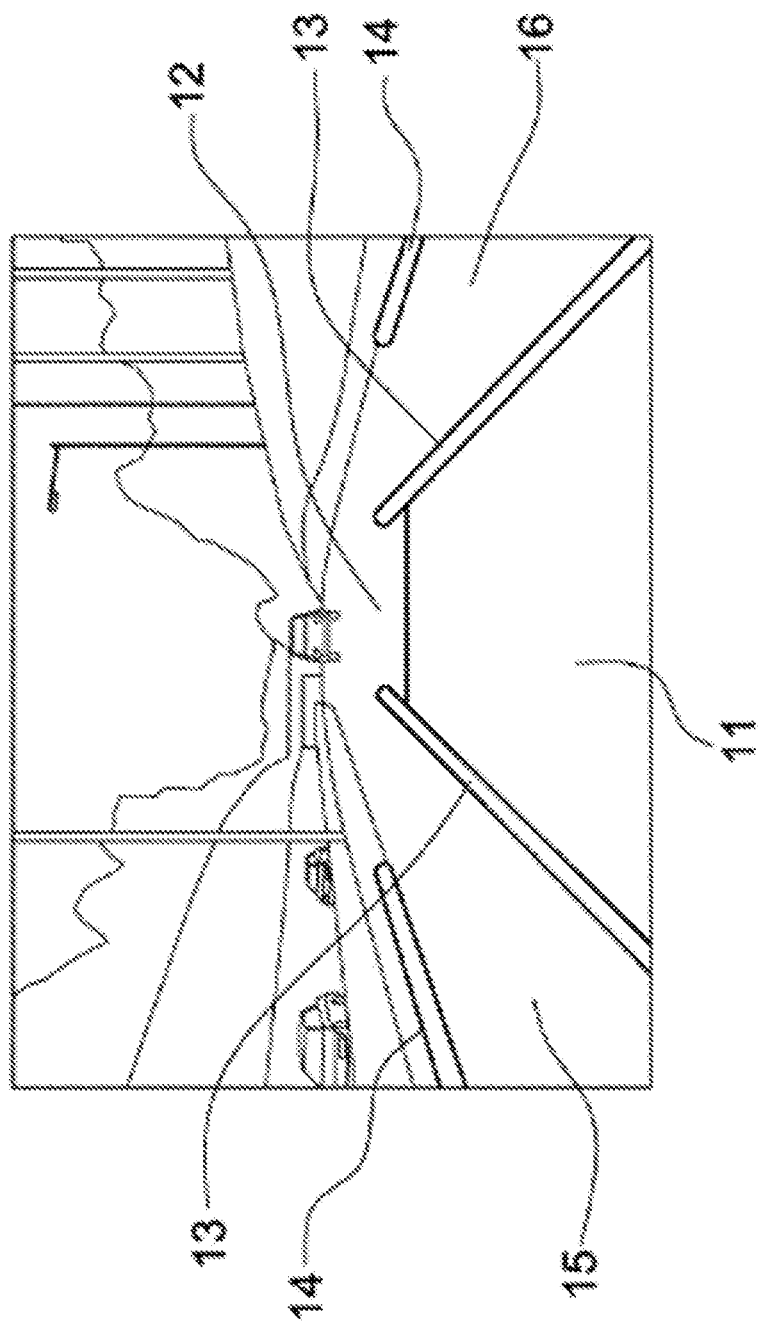
FIG. 2A is a camera-view of a driving scenario.

FIG. 2A shows a view from a camera mounted to an ego vehicle. Overlaid on the view is an identified lane area 11 located on the central lane 12. The identified lane portion is located between detected portions of line markings 13. A left lane 15 is located on the left of the central lane 12, and a right lane 16 is located on the right of the central lane 12. It will be apparent that the detected portions of the lane markings only extend to a maximum distance from the ego vehicle.

Figure 2B:
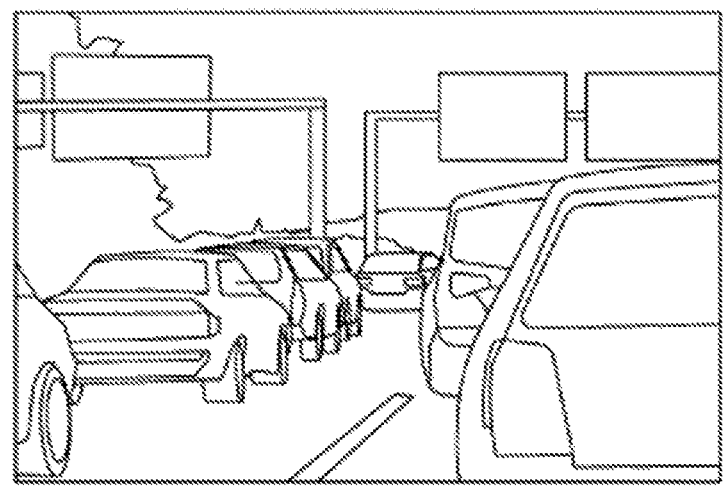
FIG. 2B is a driving scenario.

FIG. 2B shows a scenario in which it is difficult or impossible for the system to detect road markings because the road markings are partially or fully obscured from the camera's view by other vehicles. Such a situation may occur, for example, in very heavy traffic or in a traffic jam.

Figure 2C:
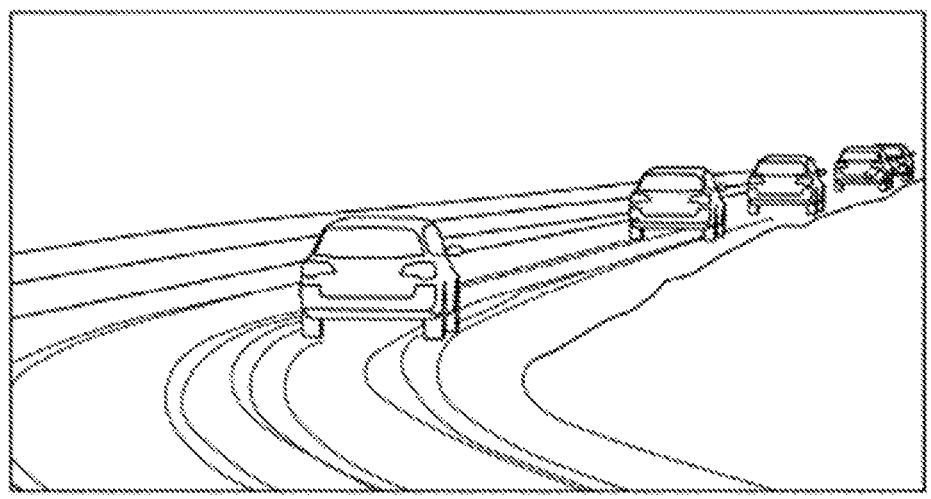
FIG. 2C is a driving scenario.

FIG. 2C shows a second example scenario in which it is difficult or impossible to detect road markings because the road markings are obscured from the camera's view by snow. It will be appreciated that there are other reasons why it may not be possible for the camera to detect the road markings as well as those illustrated by FIGS. 2B and 2C.

When it is difficult or impossible to use identify lane markings, and in turn, to identify the lane positions, another method of identifying lane positions is required. The advanced driver assistance system may then make use of those lane positions in a variety of driver assistance or automated driving functionalities.

According to the present invention, clustering historically measured positions of objects is performed. This may permit building a graph of drivable paths from the reconstructed trajectories of vehicles detected by sensors (e.g. Radar, Camera) mounted in an autonomous car. The perceived objects are tracked and for every object a history is calculated by, for example, an Object History module. Each object history (or object track) is an object that stores position information of certain objects over several execution cycles to create a trace of an object's path/trajectory in the current ego coordinate system. Such an object history module is not a part of the present invention described herein.

According to the present invention, the object history points are merged, clustered and labelled with meta-information. A graph of the underlying road infrastructure (including road lanes) can be generated with this information. The generated road infrastructure can be used for different applications, for example:

Updating high precision maps;

generating local temporary maps;

improving lane position estimation in case of insufficient lane information from other sources, for example camera-detected lanes or radar-supported road lane boundaries, and;

object-to-lane assignment in case of insufficient lane information from the camera.

All of these applications of the present invention, and others, may be useful for autonomous driving or Advanced Driver Assistance Systems (ADAS).

Figure 3:
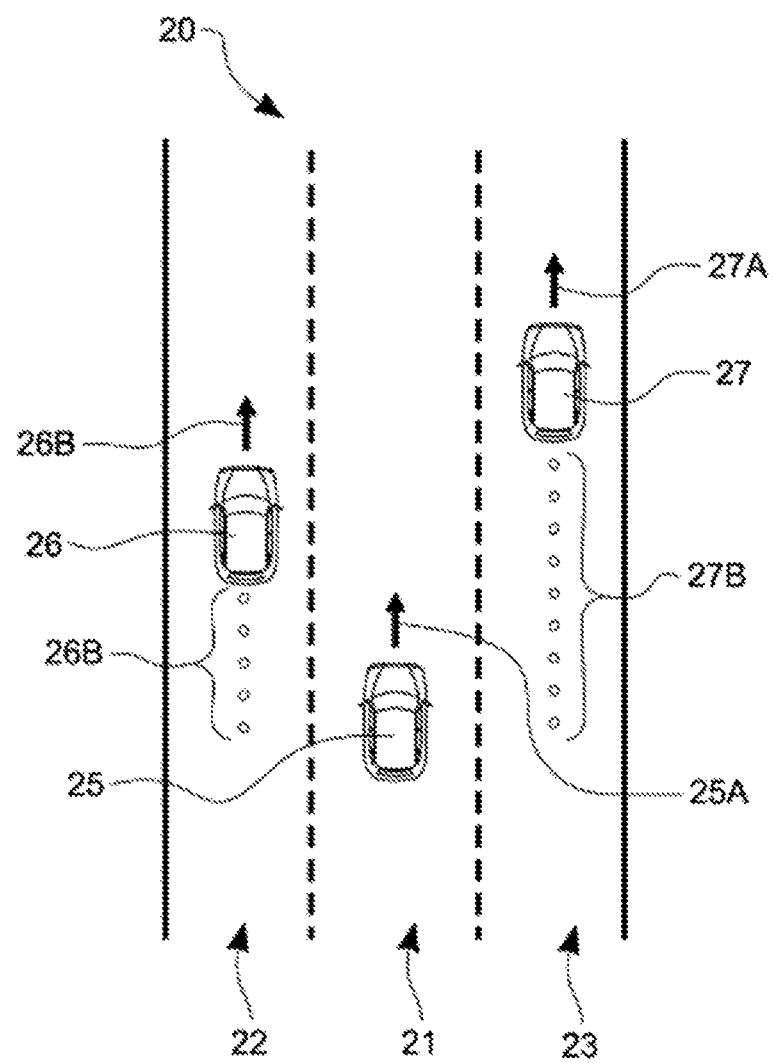
FIG. 3 is a first schematic bird's-eye view of a driving scenario.

FIG. 3 shows a bird's-eye schematic view of a typical driving situation on a road 20. The road 20 has three lanes along which traffic can travel: a central traffic lane 21, a left lane 22 and a right lane 23. The left lane 22 is separated from the central lane 21 by a lane marking; similarly, the right lane 23 is separated from the central lane 21 by another lane marking. The outer limit of the right lane 23 is designated by a solid lane marking; similarly, the outer limit of the left lane 22 is designated by another solid lane marking.

FIG. 3 illustrates an ego vehicle 25 fitted with a driver assistance system including an apparatus according to a first embodiment of the present invention. The ego vehicle 25 is driving along the central lane 21 of the road 20. The direction of travel of the ego vehicle 25 is shown by an arrow 25A. Two other vehicles, 26, 27 are also shown travelling along the road 20. The direction of travel 26A, 27A for each of the other vehicles 26, 27 is also shown in FIG. 3.

Evidently, all of the vehicles shown in FIG. 3 are travelling in generally the same direction (upwards on the page). Accordingly, the road 20 of FIG. 3 corresponds, for example, to half of a highway or motorway. A corresponding second half of the highway or motorway is not shown, but would be located to one side (either to the right or to the left, as seen in FIG. 3) of the road 20 (which side clearly depends on the country in which the road is located). The vehicles on the second half of the highway or motor would travel in generally the opposite direction to the vehicles on the road 20.

The ego vehicle 25 is fitted with at least one sensor. One of the sensors may, for example, be a vehicle RADAR or a LIDAR. The driver assistance system uses the data from the sensor to measure and determine the positions of objects within the field of view of the sensor(s) that are located in the vicinity of the ego vehicle 25. In the scenario shown in FIG. 3, the driver assistance system has detected two objects 26, 27, which are, in fact, the first and second vehicles 26, 27 in this example. For each of the first and second objects 26, 27 the driver assistance system sequentially measures the position of the respective object 26, 27. The measurements are made periodically, although this is not a requirement of the present invention. What is important is that a sequence of position measurements are made.

For each object, an object track is formed. The object track includes the sequence of position measurements 26B, 27B of the object, a fitted mathematical approximation of the measured positions, a length of the sequence or a length of the fitted mathematical approximation.

The object position sequence for the first object 26 is illustrated by the first object position sequence 26B. The object position sequence for the second object 27 is illustrated by the second object position sequence 27B.

If the first object 26 travels within the left lane 22, then it will be appreciated that the first object position sequence generally follows the course of the left lane 22. Equally, if the second object 27 travels within the right lane 23, then it will be appreciated that the second object position sequence 27B generally follows the course of the right lane 23. The first and second objects 26, 27 are each moving relative to the road 20. On the basis that it is likely that the first and second objects are each travelling down the centre of a respective lane most of the time, then movement of the first and second objects generally maps their respective lane path.

Figure 4:
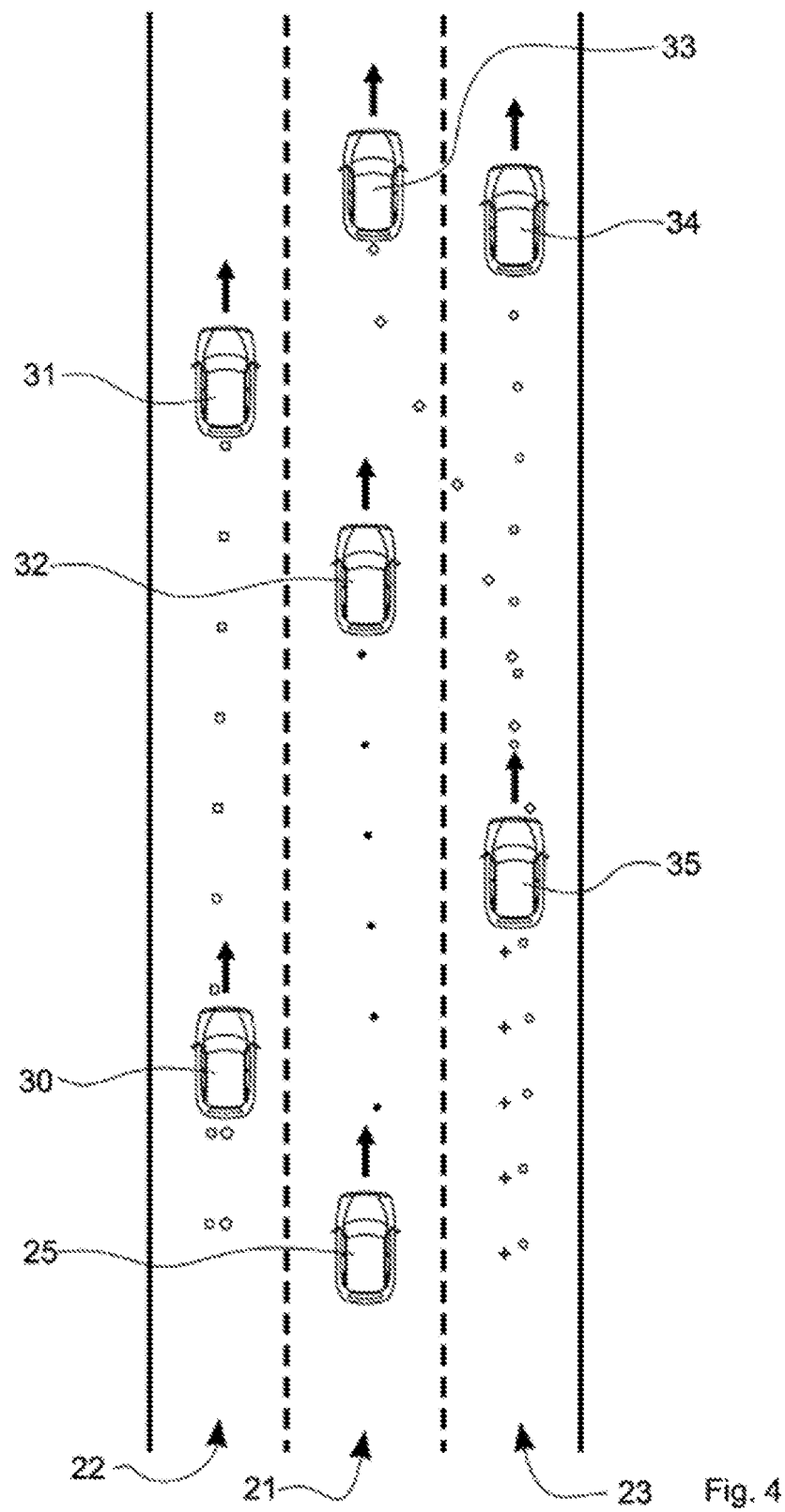
FIG. 4 is a second schematic bird's-eye view of a driving scenario.
Figure 6:
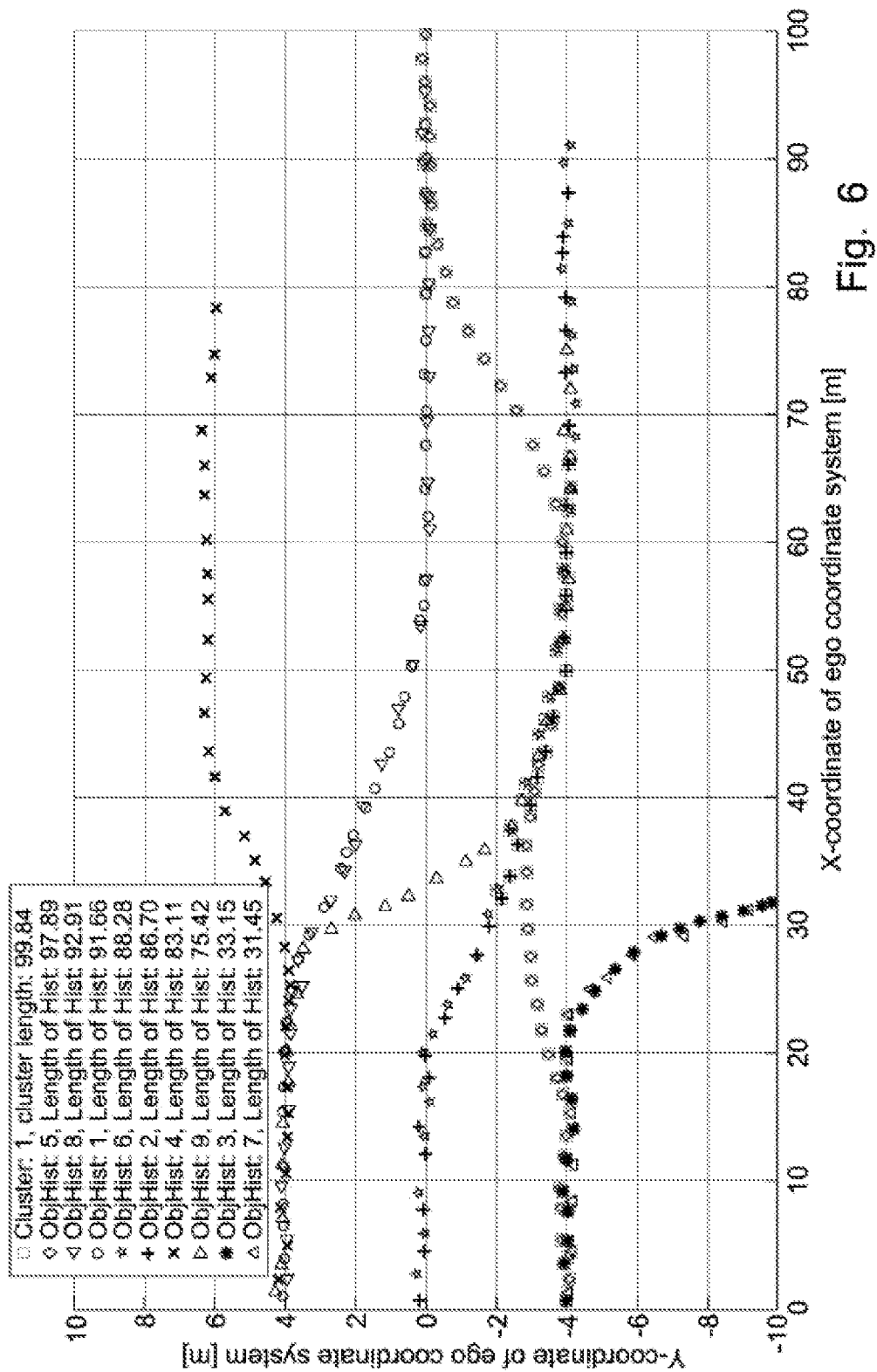
FIG. 6 is a plot of measured positions for a number of objects in the third driving scenario.

FIG. 4 shows a more complex scenario for the ego vehicle 25. In the scenario of FIG. 6, the ego vehicle 25 has detected six objects: the first to sixth objects 30, 31, 32, 33, 34, 35. The driver assistance system has sequentially measured the position of each of the six objects 30, 31, 32, 33, 34, 35 to form six separate object position sequences, illustrated as follows on FIG. 4:

First object 30—object position sequence shown by open pentagons;

Second object 31—object position sequence shown by open squares;

Third object 32—object position sequence shown by filled circles;

Fourth object 33—object position sequence shown by open diamonds;

Fifth object 34—object position sequence shown by open circles, and;

Sixth object 35—object position sequence shown by four-pointed stars.

Each measured position may be transformed into co-ordinates that are in a rest-frame of the ego vehicle 25. Accordingly, compensation for motion of the ego vehicle 25 may be achieved. For the avoidance of doubt the rest-frame of the vehicle means a co-ordinate system in which the ego vehicle is at rest, or not moving. The ego vehicle may be located at the origin of the rest-frame co-ordinate system. The transformation into the rest frame is performed for each sequence of measured object positions for each time step (i.e. each time the functions are evaluated) to compensate for motion of the ego vehicle.

The fourth object 33 has moved from the right lane 23 into the central lane 21. In other words, the measured position sequence for the fourth object (open diamonds in FIG. 4) demonstrate that as the fourth object has travelled along the road it has changed lanes.

Objects that are not moving relative to the road, i.e. static objects such as trees, road signs or other road furniture, may be discarded. A discarded object is not used in any further processing and is not used in the object clusters.

Figure 5:
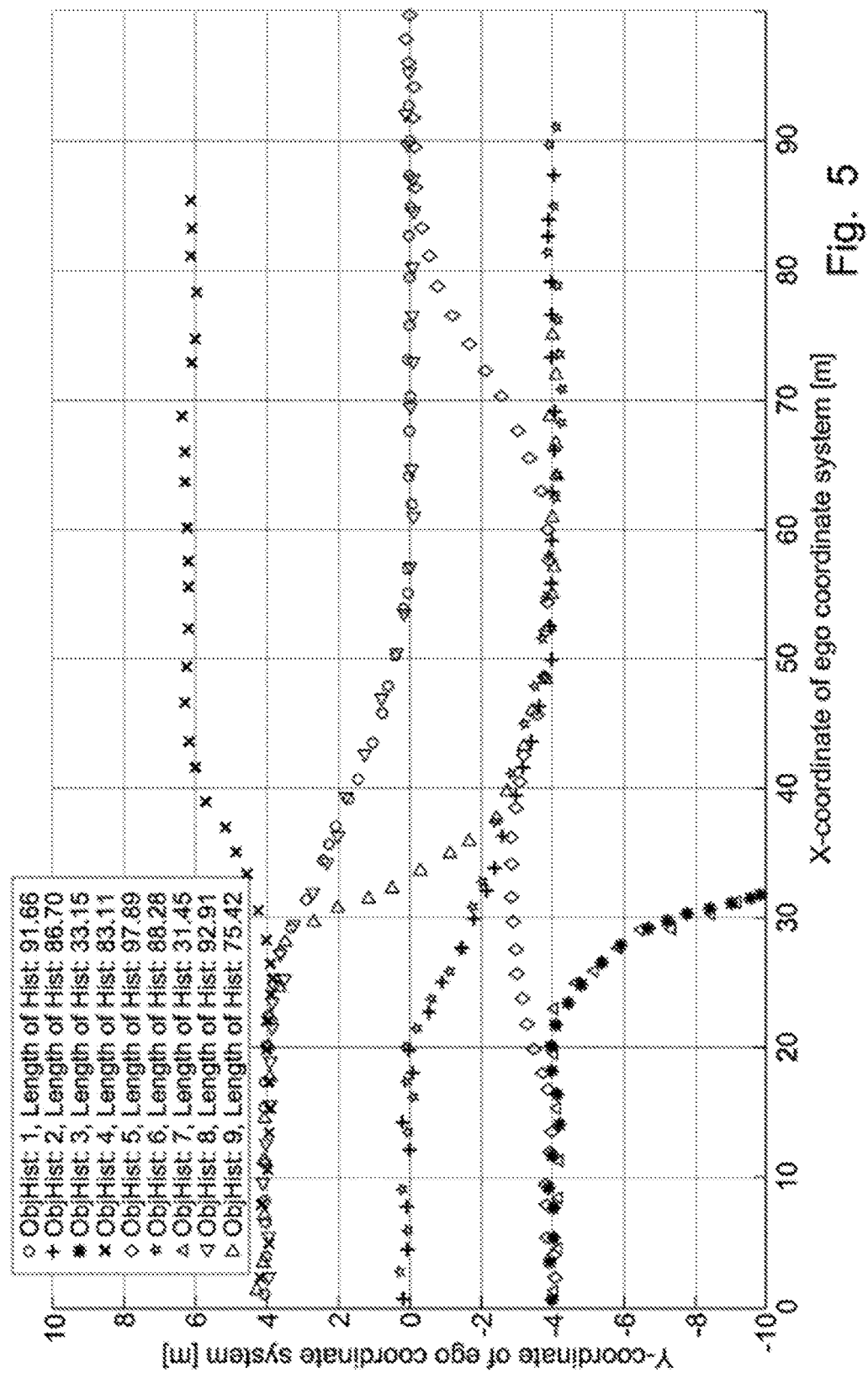
FIG. 5 is a plot of measured positions for a number of objects in a third driving scenario.

FIG. 5 is a plot showing nine object tracks 1 to 9 (labelled as ObjHist 1 to ObjHist 9) in a further driving scenario. Each object track comprises a position sequence. The length of each object track may be equal to the length of a line passing through each of the points of the position sequence.

Object track 1 is shown as "open circles", and has a length of 91.66 metres;

Object track 2 is shown as "plus signs", and has a length of 86.70 metres;

Object track 3 is shown as "asterisks", and has a length of 33.15 metres;

Object track 4 is shown as "crosses (x)", and has a length of 83.11 metres;

Object track 5 is shown as "open diamonds", and has a length of 97.89 metres;

Object track 6 is shown as "open stars", and has a length of 88.28 metres;

Object track 7 is shown as "open upwards-pointing triangles", and has a length of 31.45 metres;

Object track 8 is shown as "open leftwards-pointing triangles", and has a length of 92.91 metres, and;

Object track 9 is shown as "open rightwards-pointing triangles", and has a length of 75.42 metres.

It is clear from FIG. 5 that some of the object tracks have relatively diverged from one another and some of the object tracks have converged to one another. Such object track behaviour may be due to the corresponding vehicle changing lanes or leaving/entering the road via a slip road, for example.

The distribution of measured positions shown in FIG. 5 constitutes a starting point for a system or method embodiment according to the present invention. The measured positions may be the outputs from a vehicle radar system, for example.

The initial phase of the embodiment is to pre-cluster the object tracks and their corresponding measurement positions into a number of object clusters in an object cluster collection. In other words, initially, in a pre-clustering phase, the assignment of the measured object positions to the object clusters may be based on the relative proximity of the measured object positions. The pre-clustering stage may correspond to step a). Subsequently, the object clusters are optimised. Object clusters may be added to the collection. Object clusters may be removed from the collection.

In the pre-clustering phase, the assignment of the measured object positions to the object clusters may be based on the relative proximity of the measured object positions. In such an example, a first pre-clustering step is to order the object tracks in descending order according to their respective lengths. For example, for the nine object tracks shown in FIG. 5, the object tracks are ordered as follows:

Object track 5, which has a length of 97.89 metres;
Object track 8, which has a length of 92.91 metres;
Object track 1, which has a length of 91.66 metres;
Object track 6, which has a length of 88.28 metres;
Object track 2, which has a length of 86.70 metres;
Object track 4, which has a length of 83.11 metres;
Object track 9, which has a length of 75.42 metres;
Object track 3, which has a length of 33.15 metres;
Object track 7, which has a length of 31.45 metres.

A second pre-clustering step is iterating through all object tracks, starting with the object history ObjHist(i) (a reference object track), where i is an index from 1 to NumObjects, and where NumObjects is equal to the number of object tracks. Where the object tracks have been ordered as above, then when index i=1, the reference object track is the object track having the longest length.

For each object track that has at least a minimum number of unvisited points measured points (MIN_NUMBER_POINTS_FOR_SPLINE), fit a polynomial spline to approximate all the UNVISITED measured object positions in the respective object track. Then, create a first (or next)

object cluster within the object cluster collection. Next, copy all unvisited measured positions from the reference object track ObjHist(i) into the created object cluster and mark those measured positions in the reference object track as VISITED.

In a third pre-clustering step, copy each measured position from all of the other object tracks ObjHist(k) [k=1 . . . NumObjects but i≠k] (i.e. the object tracks other than the reference object track) into the same newly-created object cluster and mark those measured points also as VISITED in the corresponding object track, if the measured position is close enough to the fitted polynomial spline derived for the reference object track. In this example, "close enough" means that the perpendicular distance between a given measured position and the fitted spline for the reference object track is within a predetermined threshold, MAX_NEIGHBOURHOOD_DISTANCE. MAX_NEIGHBOURHOOD_DISTANCE may be equal to 1 metre, for example. It will be appreciated that there are other possible for methods for defining the closeness of the measured position and the spline which are equally effective.

Each object track may have a minimum number of measured positions, which may be equal to four, for example. Each object cluster may have a minimum number of measured positions assigned to it, which may be equal to four, for example.

FIG. 6 illustrates the first object cluster generated according to the above methodology. Each measured position within the first object cluster is shown in FIG. 6 as surrounded by a square. The first object cluster contains all the position measurements of object track with the index 5 (ObjHist 5), which corresponds to the reference object track. The first object cluster also contains position measurements from other object tracks to that are "close enough" to the spline fitted to the points of the reference object track. Thus, a plurality of measured positions have been assigned to the first object cluster. The first object cluster is a member of the object cluster collection. The plurality of measured positions corresponding to the first object cluster correspond to a number of different object tracks in the example of FIG. 6. Measured points copied to the first object cluster are marked as VISITED.

After generating the first object cluster as above, the remaining object clusters are generated and added to the object cluster collection in a similar manner. For example, the second object cluster is generated by fitting a polynomial spline to the UNVISITED measured positions in the second longest object track; creating a second object cluster; copying all UNVISITED measured positions from the second object track into the second object cluster, and; copying each UNVISITED measured position from all of the other object tracks into the second object cluster and mark them also as VISITED in the corresponding object track, if the measured position is close enough to the fitted polynomial spline derived for the second object track. The second object cluster is also thereby a member of the object cluster collection.

This process is repeated until all of the UNVISITED measured positions from the object tracks have been assigned to an object cluster and are consequently marked as VISITED.

Figure 7:
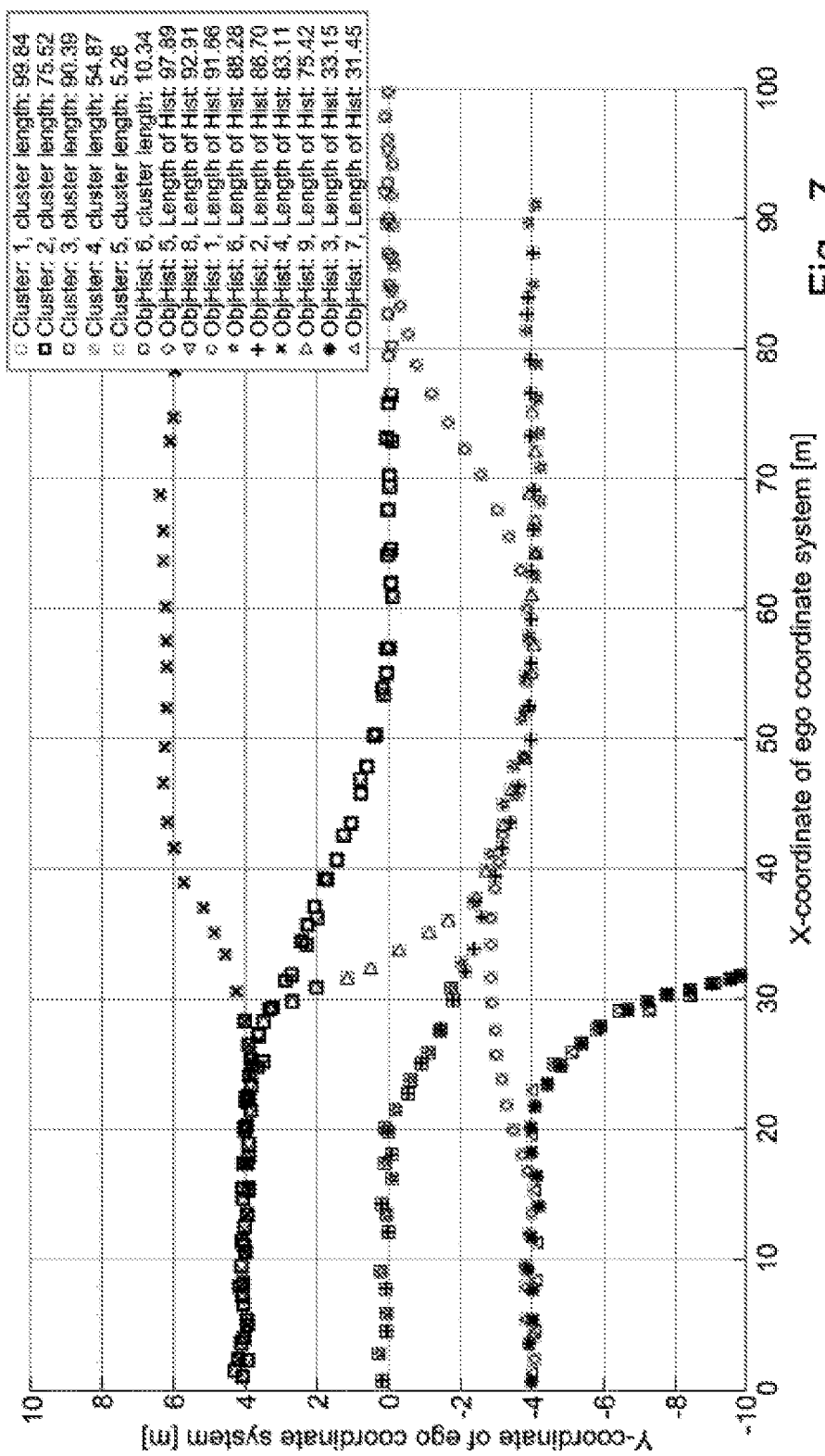
FIG. 7 is a plot of measured positions for a number of objects in the third driving scenario.

FIG. 7 illustrates six object clusters generated according to this methodology. The six object clusters are each part of the object cluster collection.

As is evident from FIG. 7, the result of the pre-clustering process may be insufficient for the identification of lane positions on the road using the object clusters. In other words, it is the clusters of FIG. 7 do not follow real-world, plausible, lanes on the road. Consequently the object clustering should be optimised. A system or method according to the present invention achieves such optimisation.

In particular, the real-world plausibility of the relative position of the object clusters to each other can be checked and acted upon to alter the object clusters collection. The criteria for the plausibility of clustering (i.e. the object cluster collection) may include the following:

confluence of individual object clusters in the collection with each other;

inner or outer location of an individual object cluster relative to all object clusters in the collection;

intersections, or contacts, between the object clusters in the collection relative to one another;

parallelism of the object clusters in the collection relative to one another.

Each of these criteria is discussed in more detail below.

In general, the system of the present invention, calculates a first diagnostic for each of the object clusters. The first diagnostic is a descriptive variable that describes some aspect of the object clusters. A value for the first diagnostic for a given object cluster reflects that descriptive variable for the given object cluster.

A calculated value for the first diagnostic potentially (see below) allows the selection of one of the object clusters in the collection as a rogue object cluster. The rogue object cluster is the object cluster that is an outlier relative to the other object clusters in the collection.

In the embodiment described herein, the first diagnostic is confluence. The value for the first diagnostic for a particular object cluster is the number of other object clusters with which the particular object cluster is confluent. Two object clusters are confluent if they converge or intersect each other with an increase in their x-coordinate (using the co-ordinate system of FIGS. 5-12, for example).

If it is not possible to distinguish a rogue object cluster on the basis of the first diagnostic, a second diagnostic may be used to distinguish the rogue objection cluster. In the embodiment described herein, the second diagnostic is contact. Two clusters are in contact if they converge or diverge or intersect each other with an increase of their x-coordinate.

Figure 8:
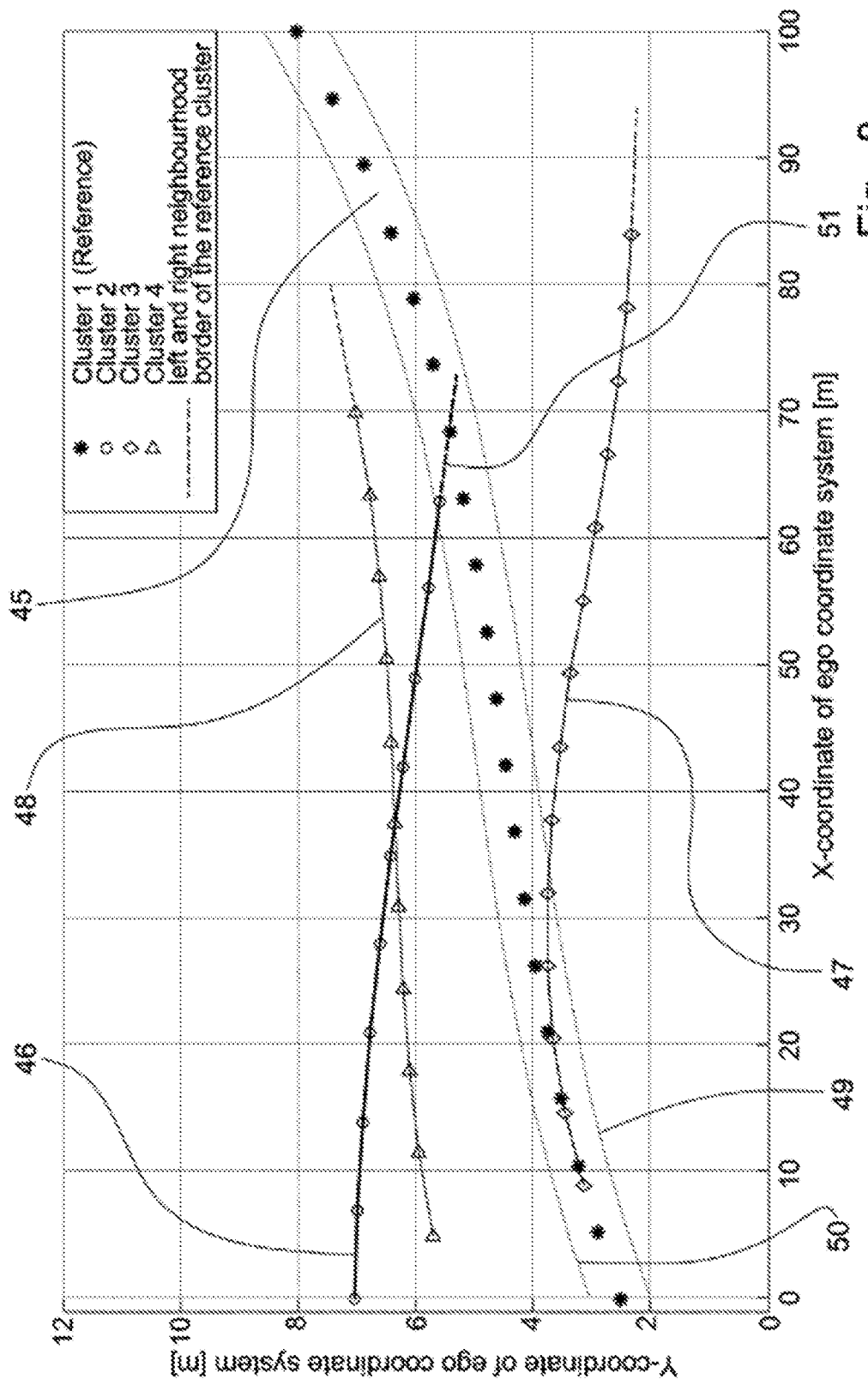
FIG. 8 is a plot illustrating confluence and contact of object tracks.

Confluence and contact will be described with reference to FIG. 8. FIG. 8 shows a first object cluster 45, a second object cluster 46, and a third object cluster 47. The "close enough" boundaries 49, 50 of the first object cluster 45 are shown parallel to the first object cluster 45.

In order to check if two object clusters are confluent or in contact, one object cluster is specified as a reference object cluster and another object cluster as a comparative object cluster. The object cluster with the longest length (the length of the imaginary line passing through all points in the object cluster) is defined as the reference object cluster, for example.

In respect of the example situation of FIG. 8, consider that the reference object cluster is the first object cluster 45 and comparative object cluster is the second object cluster 46. Consider also the neighbourhood around the reference object cluster (that is, the space between the two boundaries 49, 50, in FIG. 8) and an extension portion 51 of the comparative object cluster (dashed line in red as an extrapolation up to 'x' meters of the comparative cluster to its right side). If the extension portion 51 of the comparative object cluster 46 enters into the neighbourhood of the reference object cluster 45 with increasing X coordinate, then the reference object cluster 45 and comparative object cluster 46 are the to be confluent with each other, otherwise they are not confluent with each other.

In the example of FIG. 8, the first object cluster 45 and the second object cluster 46 are confluent and in contact with each other. Conversely, the first object cluster 45 and the third object cluster 47 are in contact with one another, but they are not confluent. Table 1 (below) shows the confluence relationships between the individual object clusters shown in FIG. 8.

TABLE 1

|  | Cluster 1 | Cluster 2 | Cluster 3 | Cluster 4 |
|---|---|---|---|---|
| Cluster 1 | not confluent | confluent | not confluent | not confluent |
| Cluster 2 | confluent | not confluent | not confluent | confluent |
| Cluster 3 | not confluent | not confluent | not confluent | not confluent |
| Cluster 4 | not confluent | confluent | not confluent | not confluent |

Table 2 (below) shows the contact relationships between the individual object clusters in FIG. 8:

TABLE 2

|  | Cluster 1 | Cluster 2 | Cluster 3 | Cluster 4 |
|---|---|---|---|---|
| Cluster 1 | not in contact | in contact | in contact | not in contact |
| Cluster 2 | in contact | not in contact | not in contact | in contact |
| Cluster 3 | in contact | not in contact | not in contact | not in contact |
| Cluster 4 | not in contact | in contact | not in contact | not in contact |

For ensuring object cluster plausibility, a confluence matrix is created. The confluence matrix is a (n+1)-by-(n+1) matrix, where n is the number of object clusters in the collection. An uncompleted confluence matrix is as follows in Table 3:

TABLE 3

|  | Cluster 1 | ... | Cluster n | Sums of rows |
|---|---|---|---|---|
| Cluster 1 | 0 | 0/1 | 0/1 | Σ |
| ... | 0/1 | 0 | 0/1 | Σ |
| Cluster n | 0/1 | 0/1 | 0 | Σ |
| Sums of columns | Σ | Σ | Σ |  |

A cell in the matrix represents the relationship between the i-th and j-th (i, j=1, . . . n) object cluster and their relative confluence (or lack of). If two object clusters are confluent with each other AND both clusters are inner clusters, then the value 1 is assigned to the corresponding cell in the confluence matrix, otherwise the integer 0 is assigned. The (n+1)th row and the (n+1)th column represent the sums of the corresponding vertical and horizontal cells, respectively.

In the example, the values for the confluence matrix include an assessment of whether the cluster in question is an "inner" or an "external" object cluster.

An "inner" object cluster is one that is surrounded by at least one object cluster on the left side and at least one object cluster on the right side. An "external" object cluster is an object cluster that is not surrounded by any object clusters on the left side and the right side. See below for more detailed explanation of whether a particular object cluster is an inner or an external cluster.

A particular object cluster is by definition neither confluent nor in contact with itself, and so the diagonal of the confluence matrix has all values equal to zero. Due to the symmetry of the confluence matrix, in further analysis only either the rows or the columns need to be considered. The further following description uses the rows, however, it will be appreciated that the columns could equally be used.

As stated above, the (n+1)th column includes the sums of the corresponding rows. The row with the maximum sum corresponds to an object cluster that is an outlier or rogue object cluster. There are two cases:

In the first confluence case, there is exactly one row having a highest unique value. In the second confluence case, there are two or more rows having the highest value. To break the degeneracy in the second confluence case, the second diagnostic is used. In the embodiment, the second diagnostic is the number of contacts.

In the first confluence case, the object cluster corresponding to the row in the confluence matrix having the highest unique value is identified as the rogue object cluster. It will be noted that the rogue object cluster includes measured positions from a number of object tracks. From those object tracks with measurements included in the rogue object cluster, the object track having the longest length is identified as a rogue object track. All of the measured positions corresponding to the rogue object track are marked as outliers and are removed from every object cluster in the collection in which those measured positions are comprised. Next, all of the other measured points included in the rogue object cluster are marked as being UNVISITED in the corresponding object tracks in which they are included. The rogue object cluster is then removed from the object cluster collection. Finally, the released points (i.e. those marked as UNVISITED) are reassigned to the remaining object clusters in the object cluster collection in an appropriate way, for example based on their distance to those object clusters.

In the second confluence case, there are two (or more) rows in the confluence matrix having the same highest value for the sum of their row. In this second case, an (m×2) contact matrix is generated, where m<n, and m is equal to the number of object clusters in the collection having the same highest value for the sum of their row in the confluence matrix, and n is equal to the number of object clusters in the current object cluster collection. For each of the object clusters having the same highest value for the sum of their row in the confluence matrix, the number of contacts is calculated. Together these calculations form a contact matrix. An example of a contact matrix is shown in Table 3 (below).

TABLE 4

| Cluster | number of contacts |
|---|---|
| u | N |
| v | M |
| ... | ... |
| w | P |

The cells in the first column of the contract matrix contain the indexes of the object clusters with the maximum sum of their row in the confluence matrix. The cells in the second column contain values which correspond to the number of other object clusters in the object cluster collection with which the relevant object cluster has a contact. The same procedure is applied to the results of the contact matrix as for the confluence matrix. That is, the maximum value in the second column of the contact matrix can be unique or there can two or more rows with the same highest value (i.e. same number of contacts).

Accordingly, two different contact cases are distinguished. In the first contact case, there is exactly one row having a highest unique value for the number of contacts.

In the second contact case, there are two or more rows having the same highest value for the number of contacts. To break this degeneracy in the second contact case, a third diagnostic is used. In the embodiment described herein, the third diagnostic is parallelism.

In the first contact case, the object cluster corresponding to the row in the contact matrix having the highest unique value is the rogue object cluster. It will be noted that the rogue object cluster includes measured positions from a number of object tracks. From those object tracks with measurements included in the rogue object cluster, the object track having the longest length is identified as a rogue object track. All of the measured positions corresponding to the rogue object track are marked as outliers and are removed from every object cluster in the object cluster collection in which those measured positions are comprised. Next, all of the other measured points included in the rogue object cluster are marked as being UNVISITED in the corresponding object tracks in which they are included. The rogue object cluster is then removed from the object cluster collection. Finally, the released points (i.e. those marked as UNVISITED) are reassigned to the remaining object clusters in the object cluster collection in an appropriate way, for example based on their distance to those object clusters.

In the second contact case, there are two (or more) rows in the contact matrix having the same highest value for the number of contacts. In this second contact case, an (m×2) parallelism matrix is generated, where m<n, and m is equal to the number of object clusters in the collection having the same highest value for the number of contacts. For each of the object clusters having the same highest number of contacts, the number of parallelisms is calculated. Together these calculations form a parallelism matrix. An example of a parallelism matrix is shown in Table 5 (below).

TABLE 5

| Cluster | number of parallelisms |
|---------|------------------------|
| u       | N                      |
| v       | M                      |
| ...     | ...                    |
| w       | P                      |

The cells in the first column of the parallelism matrix contain the indexes of the object clusters with the highest value for the number of contacts. The cells in the second column of the parallelism matrix contain values which correspond to the number of other object clusters in the cluster collection with which the relevant cluster is parallel.

A similar procedure is applied to the results of the parallelism matrix as for the confluence and contact matrices. The difference for the parallelism matrix is that the object cluster having the lowest value in the second column of the parallelism matrix is identified as being unique or identified as being comprised in two or more rows with the same lowest value.

Again two different parallelism cases are distinguished. In the first parallelism case, there is exactly one row in the parallelism matrix having a lowest unique value. In the second parallelism case, there are two or more rows in the parallelism matrix having the lowest value.

In the first parallelism case, the object cluster corresponding to the row in the parallelism matrix having the lowest unique value is the rogue object cluster. It will be noted that the rogue object cluster includes measured positions from a number of object tracks. From those object tracks with measurements included in the rogue object cluster, the object track having the longest length is identified as a rogue object track. All of the measured positions corresponding to the rogue object track are marked as outliers and are removed from every object cluster in the object cluster collection in which those measured positions are comprised. Next, all of the other measured points included in the rogue object cluster are marked as being UNVISITED in the corresponding object tracks in which they are included. The rogue object cluster is then removed from the cluster collection. Finally, the released points (i.e. those marked as UNVISITED) are reassigned to the remaining object clusters in the collection in an appropriate way, for example based on their distance to those object clusters.

In the second parallelism case, there are two (or more) rows in the parallelism matrix having the same lowest value for the number of parallelisms. In this case, each object cluster corresponding to a row in the parallelism matrix having the lowest value is a rogue object cluster. For each rogue object cluster, from those object tracks with measurements included in the rogue object cluster, the object track having the longest length is identified as a rogue object track. All of the measured positions corresponding to the rogue object track are marked as outliers and are removed from every object cluster in the collection in which those measured positions are comprised. Next, all of the other measured points included in the rogue object cluster are marked as being UNVISITED in the corresponding object tracks in which they are included. The rogue object cluster is then removed from the cluster collection. This is repeated for each rogue object cluster identified by the parallelism matrix. Finally, the released points (i.e. those marked as UNVISITED) are reassigned to the remaining object clusters in the collection in an appropriate way, for example based on their distance to those object clusters.

The creation and evaluation of the confluence matrix, and, if necessary, the contact matrix, and, if necessary, the parallelism matrix continues until the sum of all rows and columns in the confluence matrix are equal to zero. When this condition is met, the remaining object clusters in the collection are verified and correct (i.e. optimised).

As the ego vehicle and surrounding objects move relatively, position measurements of the objects are performed. These newly acquired measurements are designated as UNVISITED. The above-described pre-clustering and optimisation process can be performed to generate a cluster collection that takes account of the newly acquired points, which may be assigned to the object clusters in the object cluster collection. Thus, the object cluster collection is optimised on the basis of the newly acquired points and a number of pre-existing points. The system can thereby be a continuous process with repeating cycles, in which the pre-clustering and optimising of the object clusters in the collection is performed for each processing cycle.

A Worked Example According to the First Embodiment Will Now be Described.

For the example situation shown in FIG. 6, the results of which are shown in FIG. 7, the confluence matrix is calculated as shown Table 6. There are six object clusters in the object cluster collection.

TABLE 6

|  | Cluster 1 | Cluster 2 | Cluster 3 | Cluster 4 | Cluster 5 | Cluster 6 | Sums of rows |
|---|---|---|---|---|---|---|---|
| Cluster 1 | 0 | 1 | 1 | 0 | 1 | 0 | 3 |
| Cluster 2 | 1 | 0 | 0 | 0 | 0 | 0 | 1 |
| Cluster 3 | 1 | 0 | 0 | 0 | 1 | 0 | 2 |
| Cluster 4 | 0 | 0 | 0 | 0 | 0 | 0 | 0 |
| Cluster 5 | 1 | 0 | 1 | 0 | 0 | 0 | 2 |
| Cluster 6 | 0 | 0 | 0 | 0 | 0 | 0 | 0 |
| Sums of columns | 3 | 1 | 2 | 0 | 2 | 0 | |

There is exactly one row having the maximum value in the confluence matrix (with a sum equal to 3). Thus, the case is the first confluence case, as described above because there is a unique highest value for cluster 1. Accordingly, cluster 1 is identified as the rogue object cluster.

The rogue object cluster (cluster 1) contains measured positions from each of the following object tracks:
ObjHist 1
ObjHist 2
ObjHist 3
ObjHist 5—rogue object track
ObjHist 6
ObjHist 7
ObjHist 8
ObjHist 9

Of those object tracks, ObjHist5 has the longest length (97.89 metres). As such, ObjHist5 is identified as the rogue object track. All the measured points corresponding to ObjHist5 are labelled as outliers and removed from any and all object clusters to which they had previously been assigned. All the other measured positions that are comprised in the rogue object cluster (i.e. cluster1 minus the positions corresponding to the rogue object track) are labelled as UNVISTED. The rogue object cluster (cluster 1) is removed from the object cluster collection.

Figure 9:
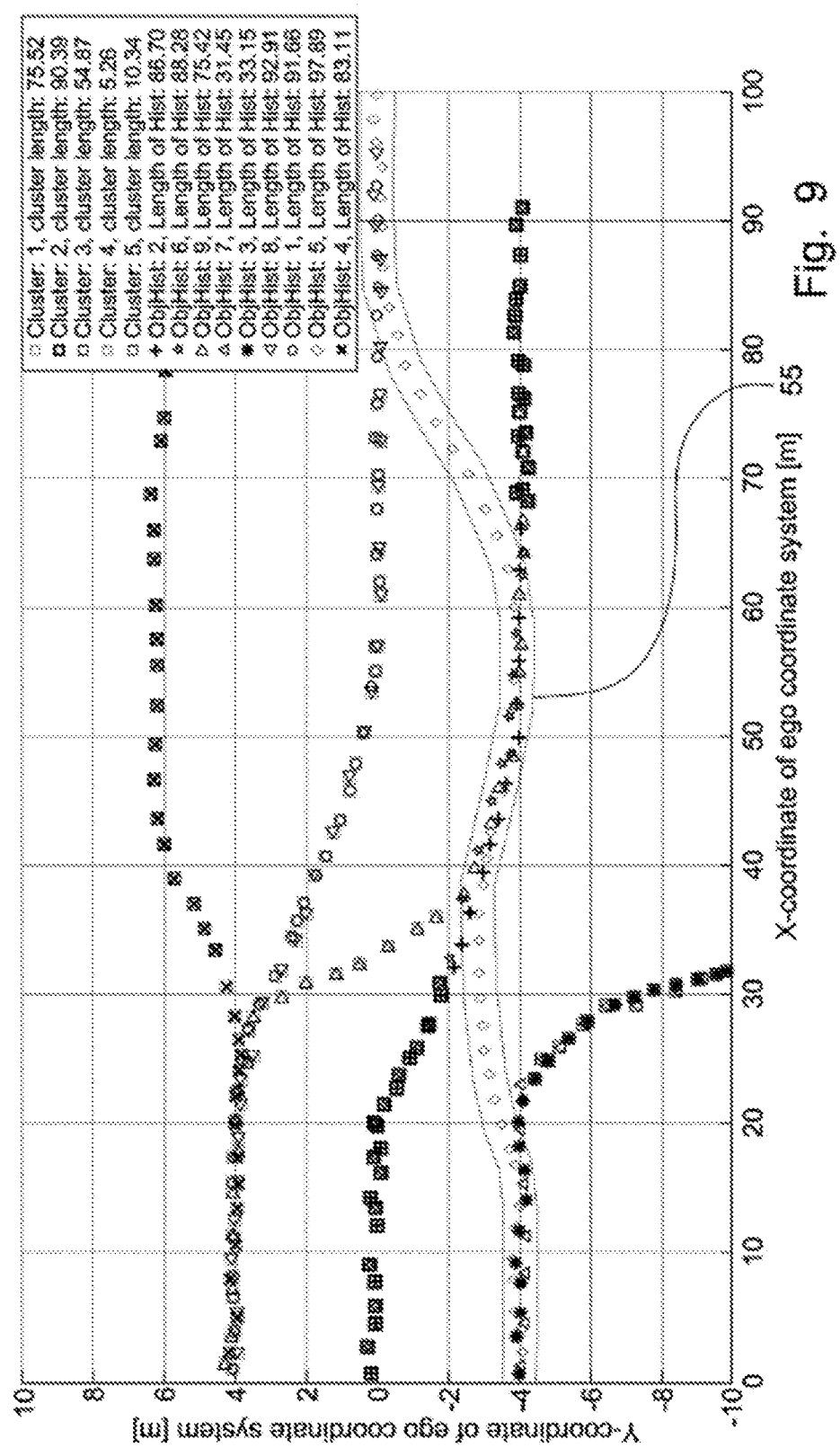
FIG. 9 is a plot of measured positions for a number of objects in the third driving scenario.

FIG. 9 illustrates the points 55 corresponding to the measured positions of the rogue object cluster (original cluster 1). Those points that correspond to the rogue object track (ObjHist5) are marked as outliers, and are not further used. Those points corresponding to other object tracks comprised in the rogue object cluster are marked as UNVISITED. The rogue object cluster is removed from the object cluster collection.

The measured positions that are marked as UNVISITED are reassigned to the object clusters remaining in the object cluster collection. It is noted that the rogue object cluster (original cluster 1) has been removed from the collection and the remaining object clusters in the collection have been renumbered (see legend on FIG. 9). The resulting object cluster collection after the reassignment and removal of original cluster 1 is shown in FIG. 10.

Figure 10:
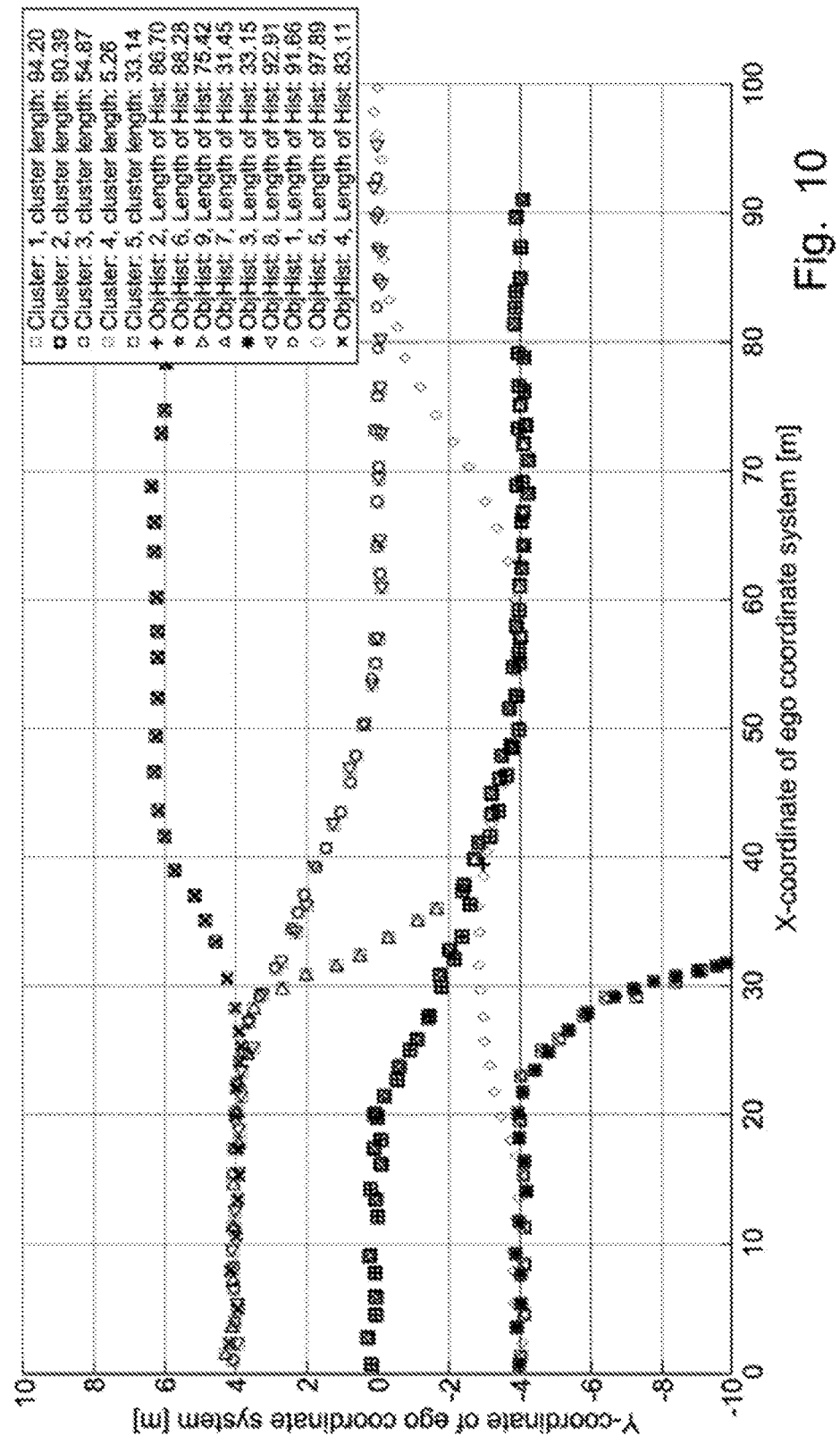
FIG. 10 is a plot of measured positions for a number of objects in the third driving scenario.

As will be appreciated from FIG. 10, now the only measured points that are not assigned to any object cluster are those that were comprised in the rogue object track (i.e. ObjHist5). These measured points are the outliers. It will be appreciated that the object clusters in the collection as shown in FIG. 10 have been optimised relative to the object clusters shown in FIG. 7 because the measured positions from object track ObjHist5 has been removed from the object clusters. ObjHist5 corresponds to measurements of a vehicle that has changed lanes, and therefore its movement does not accurately reflect the position of a single road lanes. The removal of the measured points of the rogue object track from the object clusters in the collection therefore permits more accurate lane determination by using the object clusters in the collection, which have been optimised.

Further optimisation is possible however, which is described as follows.

Based on the clusters showed in FIG. 10, a new confluence matrix is generated (see table 7 below).

TABLE 7

|  | Cluster 1 | Cluster 2 | Cluster 3 | Cluster 4 | Cluster 5 | Sums of rows |
|---|---|---|---|---|---|---|
| Cluster 1 | 0 | 0 | 0 | 0 | 0 | 0 |
| Cluster 2 | 0 | 0 | 0 | 1 | 0 | 1 |
| Cluster 3 | 0 | 0 | 0 | 0 | 0 | 0 |
| Cluster 4 | 0 | 1 | 0 | 0 | 0 | 1 |
| Cluster 5 | 0 | 0 | 0 | 0 | 0 | 0 |
| Sums of columns | 0 | 1 | 0 | 1 | 0 | |

In this confluence matrix, the maximum of sums of rows is 1. There are two rows with the sum equal to 1: Cluster 2 and Cluster 4. This confluence matrix forms an example of the second confluence case. In other words, there are two rows in the confluence matrix having the same highest value for the sum of their row (equal to 1). In this second confluence case, an (m×2) contact matrix is generated, where m is equal to the number of object clusters in the collection having the same highest value for the sum of their row in the confluence matrix. In this case therefore m=2.

Table 8 shows the contact matrix for the two object clusters having the same highest value in the sum of their respective rows in the confluence matrix.

TABLE 8

| Cluster | number of contacts |
|---|---|
| Cluster 2 | 1 |
| Cluster 4 | 3 |

Cluster 2 has only one contact, in particular with Cluster 4; Cluster 4 has contact with three different clusters (Cluster 1, Cluster 2 and Cluster 3). Since the maximum value in the second column in Table 8 is unique (equal to 3), the first contact case occurs. Cluster 4 is therefore identified as the rogue object cluster.

Figure 11:
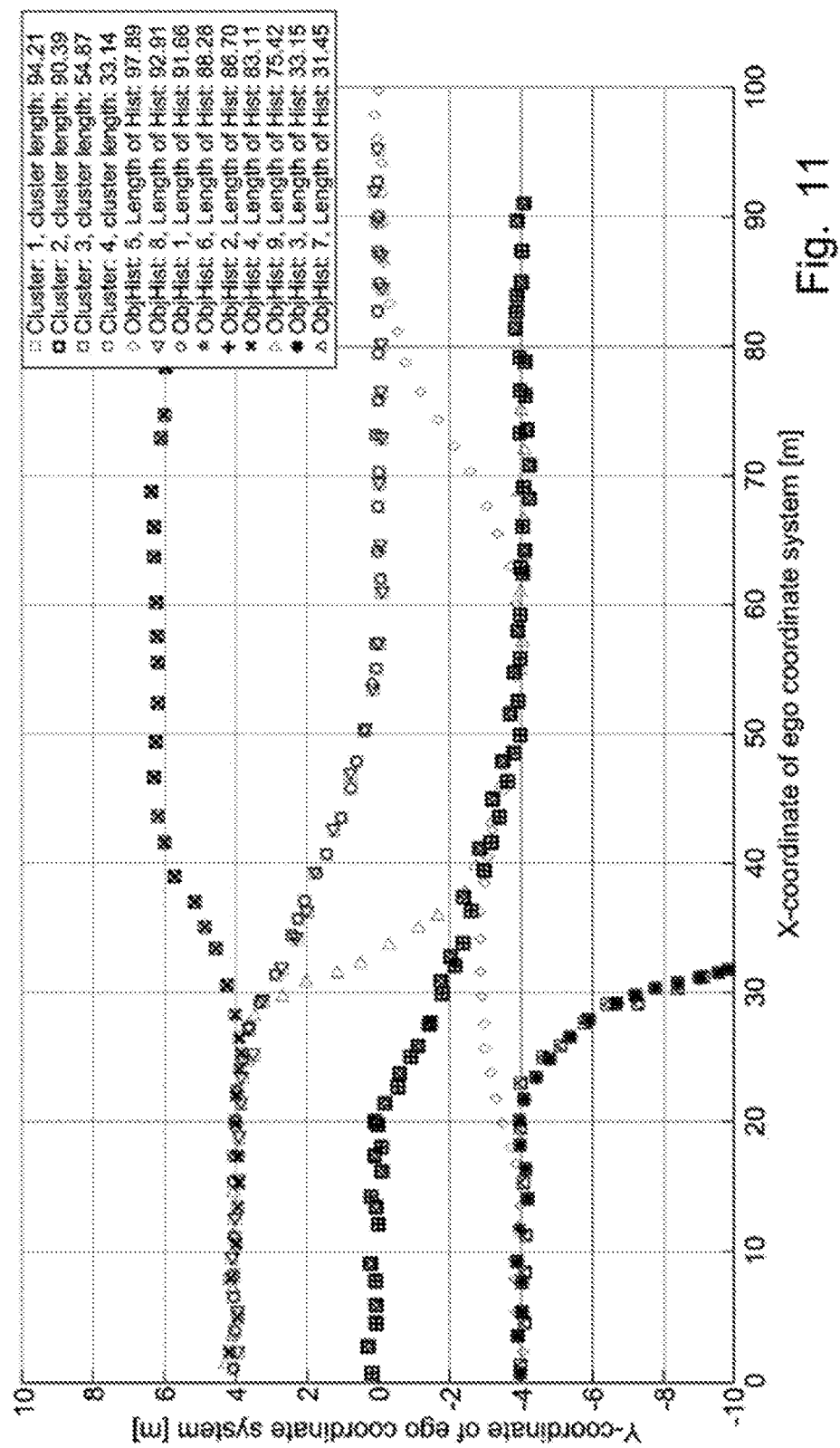
FIG. 11 is a plot of measured positions for a number of objects in the third driving scenario.

The same process is then applied to cluster 4 as was applied to original cluster 4 above. The longest object track in cluster 4 is object track ObjHist9, which also happens to be the only object track within the cluster 4. Object track ObjHist9 is therefore identified as the rogue object track. In the next step, all the measured positions corresponding to the rogue object track ObjHist9 are labelled as outlier and are then removed from any object cluster to which they are assigned. Rogue object cluster (cluster 4) is then removed from the object cluster collection. Because all of the measured points comprised in the rogue object track happened to correspond to the rogue object track, there are no points from other object tracks to reassign in this example. The result of this second iteration is shown in FIG. 11. The object cluster collection now comprises four object clusters (re-numbered after the removal of the rogue object cluster from the object cluster collection).

Further optimisation is possible however, which is described as follows.

Based on the clusters showed in FIG. 11, a new confluence matrix is generated (see Table 9 below) for the four object clusters in the object cluster collection.

TABLE 9

|  | Cluster 1 | Cluster 2 | Cluster 3 | Cluster 4 | Sums of rows |
|---|---|---|---|---|---|
| Cluster 1 | 0 | 0 | 0 | 0 | 0 |
| Cluster 2 | 0 | 0 | 0 | 0 | 0 |
| Cluster 3 | 0 | 0 | 0 | 0 | 0 |
| Cluster 4 | 0 | 0 | 0 | 0 | 0 |
| Sums of columns | 0 | 0 | 0 | 0 |  |

Each and all of the rows have a sum equal to zero. This means that each of the four object clusters in the object cluster collection have a plausible course. The process of object cluster optimisation is completed.

Subsequently, more position measurements are performed and received by the system for the same or newly recognised object. New measurements may be received during a single processing cycle. The new positions will initially be marked as UNIVISITED. The object cluster collection at the start of each cycle may be empty. A pre-clustering phase is performed to initially create and populate the object cluster collection, which is then optimised according to the methodology described herein. This pre-clustering and optimisation may be performed for each cycle. Each cycle may correspond to a time step in which new position measurements are acquired. This repeated, cyclical, processing may result in a constantly updated and optimised object cluster collection is maintained as object measurements are newly acquired by the vehicle.

Each object cluster generally corresponds to vehicles that are travelling within real world traffic lanes. Accordingly, the mathematical description of the object clusters in the collection can be used to determine the position of those real world lanes, and for advanced driving aids, many of which require knowledge of real world lane positions.

For completeness a number of example auxiliary functions used in the above-described embodiment will now be described.

Curve Fitting

As discussed above, a sequence of measured positions is approximated by a mathematical function across the range of the range of the measured positions. The sequence of measured positions may be those comprised in an object track or those comprised in an object cluster (which may include measured points from a plurality of object tracks). Such mathematical functions describe the relative positions of two object clusters and may permit calculation of confluence, contact, or parallelism of those object clusters.

One such possibility for the mathematical function a single polynomial of nth order. By increasing the order of the polynomial, n, greater changes of curvature may be taken into account and good fitting results achieved. For example, it might be possible either to fit higher order polynomial, or to fit a spline consisting of lower order polynomials, through the given set of points (position measurements).

In polynomial regression models, as the order increases, the $X \cdot X^T$ (where X is the Vandermonde-matrix) matrix becomes ill-conditioned. As a result, $(X \cdot X^T)^{-1}$ may not be accurate and the parameters of the polynomial may be estimated with considerable error.

Polynomials of the 3rd order are commonly used. However, due to the fact that fitting results based only on one cubic polynomial might be insufficient (see dashed brown curve 60 in FIG. 12), a cubic spline is used in the example embodiment.

Figure 12:
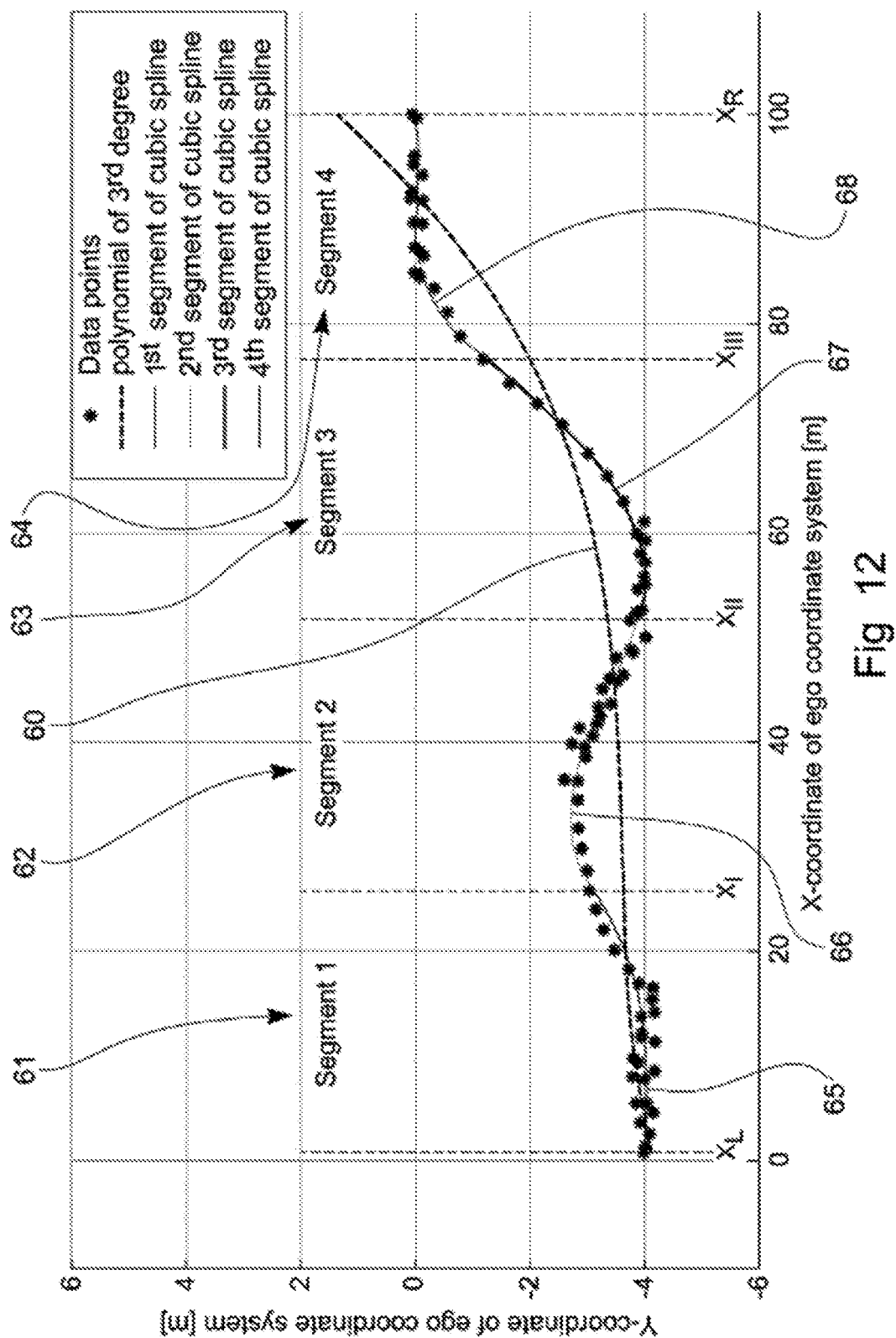
FIG. 12 is a plot illustrating the fitting of a spline.

FIG. 12 illustrates a cubic spline fit to the points corresponding to each of four segments. The points are shown as asterisk symbols in FIG. 12. The range of x of the points has been divided into four segments, 61, 62, 63, 64. Using the cubic spline method, the range of x is divided into segments and for each segment a polynomial of 3rd order is fitted. Each adjacent pair of the piecewise polynomials 65, 66, 67, 68 have the same continuous function values at their connection point (knot). That is, the first derivatives, as well as the second derivatives, are equal at the knots between the two piecewise polynomials 65, 66, 67, 68 of the spline.

It is evident from FIG. 12 that in this example the spline is a better approximation of the points that the third order polynomial 60 fitted over the full range of x.

The algorithm of spline fitting consists of two steps. In the first step the range of x is divided into several segments and in the second step a polynomial for each segment is fitted.

Dividing of X-Range Into Segments

Depending on the number of data points the whole x range may be divided into a plurality of segments. For example, the number of segments may be equal to four. The prerequisite for creating segments is that the data points are sorted in ascending order according to their x coordinates.

First, an interval is calculated by dividing the entire x-range into four equidistant subranges. Every segment has a left and a right border and every border goes exactly through a data point, the leftmost data point represents the left border of the first segment. Then as much data points are assigned to the segment until the x-distance between the left and the right border point is at least the calculated interval, provided that there are enough data points. The right border of a first subrange also forms the left border of the next subrange (in the sense of increasing x).

After the first subrange is created, an amount of remaining data points are assigned to the next segment in the same way as in the case of the first segment until the x-distance between the left and the right border point is at least the calculated interval, provided that there are enough data points. The minimum number of data points for an interval may be a predetermined variable, MIN_NUMBER_POINTS_PER_INTERVAL. If there are not at least MIN_NUMBER_POINTS_PER_INTERVAL remaining data points, then all the remaining data points may be assigned to the previously created segment. MIN_NUMBER_POINTS_PER_INTERVAL may be equal to 4, for example.

Figure 13:
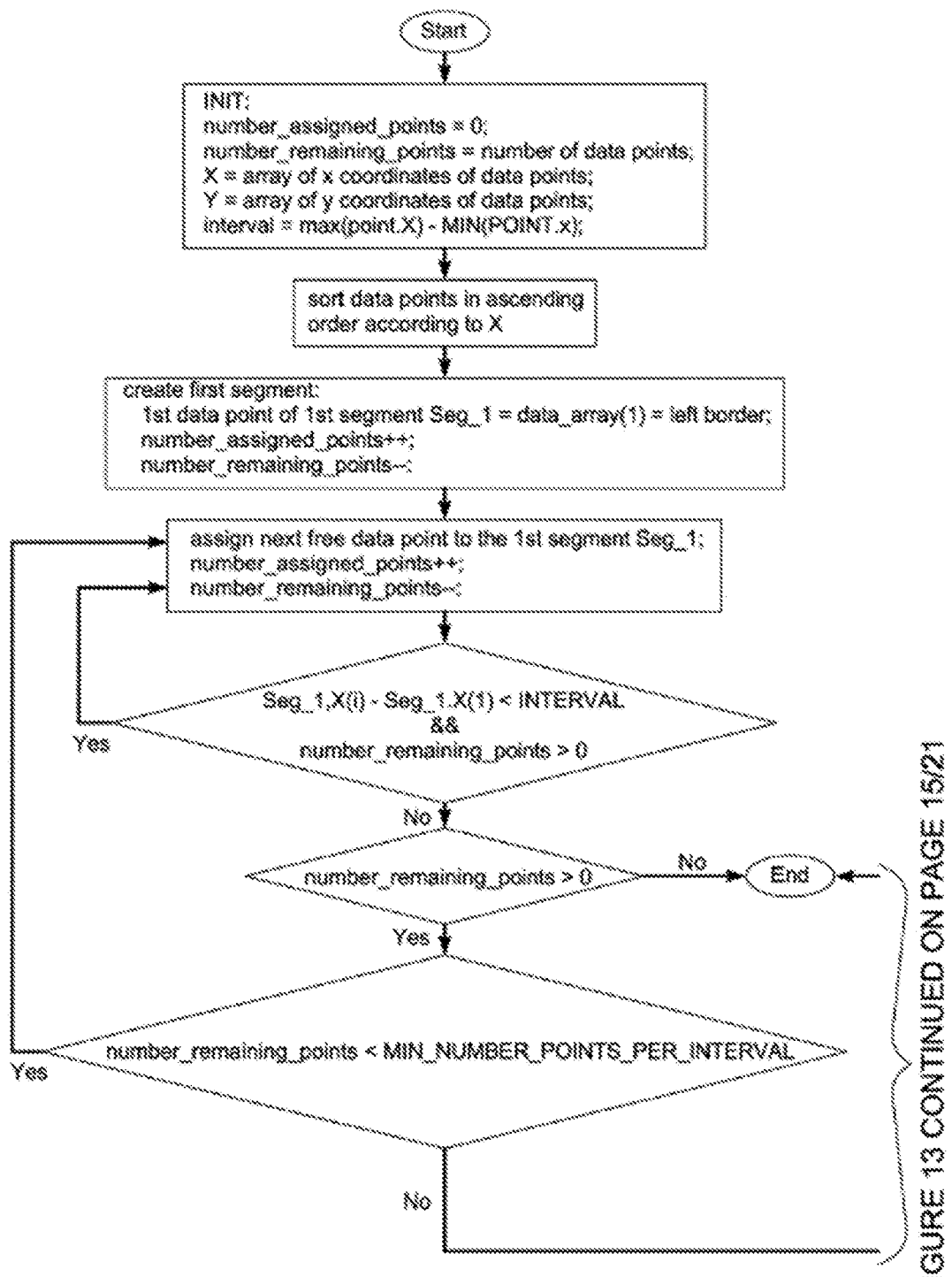
FIG. 13 illustrates the method steps for segmenting measured positions.
Figure 13:
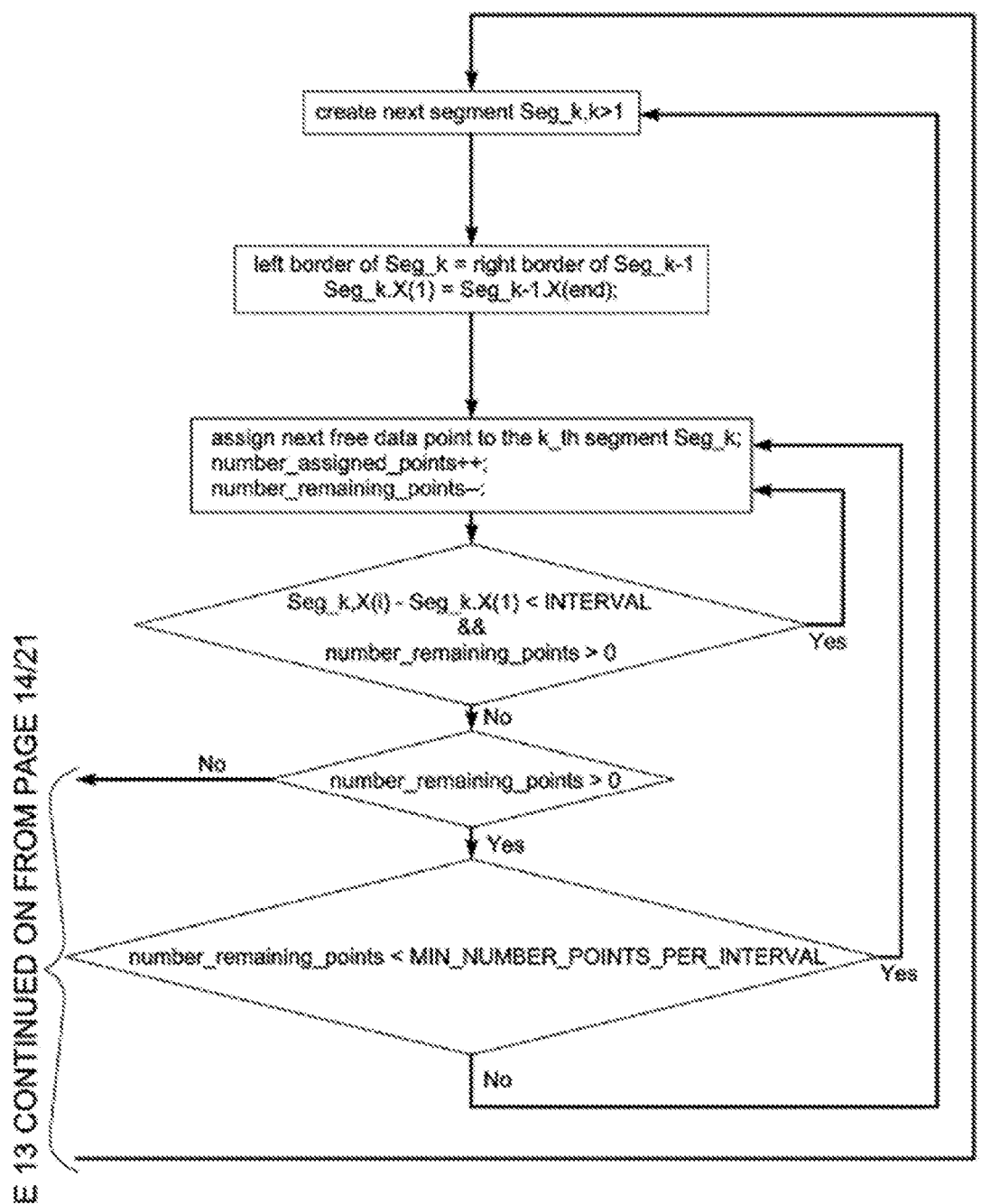

Creation of subsequent segments is continued until the range of x is divided up in to 4 segments, for example. FIG. 13 shows a flow chart illustrating the segment dividing process.

Spline Fitting

This section describes how to perform a curve fitting as a process of constructing a mathematical function, that has best fit to a set of data points as illustrated in FIG. 12. Depending on the number of data points, there can be assigned either one segment or up to four segments. Thus, depending on the number of segments there are two approaches:

Spline Fitting if the Data Points are Grouped in One Segment

The goal is to estimate the parameters of the following mathematical model:

$$\hat{y}_i = p(x_i) = a_0 + a_1 \cdot x_i + a_2 \cdot x_i^2 + a_3 \cdot x_i^3, \forall x_L \le x_i \le x_R$$

Eq. (1) for i=1, . . . , N; N≥M, where N is the number of data points in the data set and M=4 is the number of parameters to be estimated. Equation 1 describes the relationship between the x and y coordinates of the data points. A method of ordinary least squares (OLS) is used with the goal of minimizing the sum of the squares of the differences between the observed y coordinates in the given dataset and those predicted by a linear function of a set of explanatory variables (y is the dependent variable, referred to also as a regressant, whereas x is the independent variable, also known as explanatory variable or as regressor; y is regressed on x). Visually this is seen as the sum of the vertical distances between each data point $y_i$ in the set and the corresponding point $\hat{y}_i$ on the regression curve—the smaller the differences, the better the model fits the data.

The estimation problem is formulated as follows:
Minimize the objective function $$f(x) = \frac{1}{2} \sum_{i=1}^{N} r_i^2 = \frac{1}{2} \sum_{i=1}^{N} (y_i - \hat{y}_i)^2 = \frac{1}{2} \sum_{i=1}^{N} (y_i - p(x_i))^2 \quad \text{Eq. (2)}$$

without any constraints.

In matrix notation, the modeled relationship between x- and y-coordinates of all data points can be written as:

$$\underline{Y} = \underline{X} \cdot \underline{\hat{a}} \quad \text{Eq. (3)}$$

$$\underline{Y} = \begin{bmatrix} y_1 \\ y_2 \\ \vdots \\ y_N \end{bmatrix} \quad \text{Eq. (4)}$$

$$\underline{X} = \begin{bmatrix} 1 & x_1 & x_1^2 & x_1^3 \\ 1 & x_2 & x_2^2 & x_2^3 \\ \vdots & \vdots & \vdots & \vdots \\ 1 & x_N & x_N^2 & x_N^3 \end{bmatrix} \quad \text{Eq. (5)}$$

$$\underline{\hat{a}} = \begin{bmatrix} \hat{a}_0 \\ \hat{a}_1 \\ \hat{a}_2 \\ \hat{a}_3 \end{bmatrix} \quad \text{Eq. (6)}$$

The sum of squared residuals in matrix notation is then $$f(\underline{\hat{a}}) = \frac{1}{2} \underline{r}^T \cdot \underline{r} = \frac{1}{2} (\underline{Y} - \underline{X} \cdot \underline{\hat{a}})^T (\underline{Y} - \underline{X} \cdot \underline{\hat{a}}) = \quad \text{Eq. (7)}$$

$$\frac{1}{2} \cdot (\underline{Y}^T \cdot \underline{Y} - 2 \cdot \underline{\hat{a}} \cdot \underline{X}^T \cdot \underline{Y} + \underline{\hat{a}}^T \cdot \underline{X}^T \cdot \underline{X} \cdot \underline{\hat{a}})$$

where $\underline{Y}$ is a column vector of y coordinates of all measured data points. In order to find $\underline{\hat{a}}$ that minimizes the objective function $f(\underline{\hat{a}})$ one needs to take the first derivative of $f(\underline{\hat{a}})$ with respect to $\underline{\hat{a}}$ and to set it equal to zero, where:

$$\frac{\partial f(\underline{\hat{a}})}{\partial \underline{\hat{a}}} = \frac{1}{2} \cdot (2 \cdot \underline{X}^T \cdot \underline{X} \cdot \underline{\hat{a}} - 2 \cdot \underline{X}^T \cdot \underline{Y}) = \underline{0} \quad \text{Eq. (8)}$$

As an aside, it is noted that when $\underline{b}$ and $\underline{a}$ are two n×1 vectors, then $$\frac{\partial (\underline{b}^T \cdot \underline{a})}{\partial \underline{b}} = \frac{\partial (\underline{a}^T \cdot \underline{b})}{\partial \underline{b}} = \underline{b}.$$

Let $\hat{b}$ be a two n×1 vector and $\hat{A}$ a symmetric n×n matrix, then $$\frac{\partial (\underline{b}^T \cdot A \cdot \underline{b})}{\partial \underline{b}} = 2 \cdot A \cdot \underline{b}$$

Eq. (8) leads to the set of simultaneous equations known as the normal equations:

$$\underline{X}^T \cdot \underline{X} \cdot \underline{\hat{a}} = \underline{X}^T \cdot \underline{Y} \quad \text{Eq. (9)}$$

where:

$\underline{Y}$ is a (n×1) vector of observations on the dependent variable;

$\underline{\hat{a}}$ is a (4×1) vector of unknown polynomial parameters that is to be estimated;

$\underline{X}$ is a (n×4) matrix which contains the observation on 4 independent variables for n observations, and;

N is the number of data points.

$\underline{X}^T \cdot \underline{X}$ and $\underline{X}^T \cdot \underline{Y}$ are known from the set of data points but $\underline{\hat{a}}$ is unknown. To check that the solution of Eq. (9) is a minimum, the second derivative of $f(\underline{\hat{a}})$ is taken, which is the same as the first derivative of Eq. (8), with respect to $\underline{\hat{a}}$. This yields to $\underline{X}^T \cdot \underline{X}$. It is clear that, as long as $\underline{X}$ has full rank, this is a positive definite matrix and hence $\underline{\hat{a}}$ as a solution of Eq. (9) is a minimum. There are two things to note about the ($\underline{X}^T \cdot \underline{X}$) matrix. First, it is always square since it is n×n. Second, it is always symmetric.

Spline Fitting if the Data Points are Divided Into Several Segments

As shown in the example of FIG. 12, the data points are divided into four segments. In this example a spline consisting of four polynomials is fitted which are defined piecewise for each and every segment:

$$\hat{y}_i = s(\underline{\hat{a}}, x_i) = \quad \text{Eq. (10)}$$

$$\begin{cases} p_1(\underline{\hat{a}}, x_i) = \hat{a}_{10} + \hat{a}_{11} \cdot x_i + \hat{a}_{12} \cdot x_i^2 + \hat{a}_{13} \cdot x_i^3, & \forall x_L \le x_i \le x_I \\ p_2(\underline{\hat{a}}, x_i) = \hat{a}_{20} + \hat{a}_{21} \cdot x_i + \hat{a}_{22} \cdot x_i^2 + \hat{a}_{23} \cdot x_i^3, & \forall x_I \le x_i \le x_{II} \\ p_3(\underline{\hat{a}}, x_i) = \hat{a}_{30} + \hat{a}_{31} \cdot x_i + \hat{a}_{32} \cdot x_i^2 + \hat{a}_{33} \cdot x_i^3, & \forall x_{II} \le x_i \le x_{III} \\ p_4(\underline{\hat{a}}, x_i) = \hat{a}_{40} + \hat{a}_{41} \cdot x_i + \hat{a}_{42} \cdot x_i^2 + \hat{a}_{43} \cdot x_i^3, & \forall x_{III} \le x_i \le x_R \end{cases}$$

where i=1, . . . , N and N is the number of data points.

Unlike the above case where all data points are grouped in one segment, here fitting of a spline to data points must satisfy the so called equality constraints between adjacent segments, in addition to minimizing the sum-of-squares-of-errors. In the example of four segments, there are following constraints:

the values of adjacent polynomials within a spline must be continuous at the boundary points (knots)

$$p_1(\underline{a}, x_i = x_I) - p_2(\underline{a}, x_i = x_I) = 0$$

$$p_2(\underline{a}, x_i = x_{II}) - p_3(\underline{a}, x_i = x_{II}) = 0$$

$$p_3(\underline{a}, x_i = x_{III}) - p_4(\underline{a}, x_i = x_{III}) = 0$$

the derivatives of adjacent polynomials within a spline must be continuous at the boundary points (knots)

$$\frac{\partial p_1(\underline{\hat{a}}, x_i = x_I)}{\partial x_i} - \frac{\partial p_2(\underline{\hat{a}}, x_i = x_I)}{\partial x_i} = 0$$

$$\frac{\partial p_2(\underline{\hat{a}}, x_i = x_{II})}{\partial x_i} - \frac{\partial p_3(\underline{\hat{a}}, x_i = x_{II})}{\partial x_i} = 0$$

$$\frac{\partial p_3(\underline{\hat{a}}, x_i = x_{III})}{\partial x_i} - \frac{\partial p_4(\underline{\hat{a}}, x_i = x_{III})}{\partial x_i} = 0$$

The fitting problem can be summarized mathematically as follows:

$$\min_{\underline{\hat{a}}} \arg f(\underline{a}, x_i) \qquad \text{Eq. (11)}$$

subject to $\underline{\underline{C}} \cdot \underline{\hat{a}} = \underline{d}$
where Eq. (12)

$$f(\underline{\hat{a}}, x_i) = \frac{1}{2} \cdot (\underline{Y} - \underline{\underline{X}} \cdot \underline{\hat{a}})^T \cdot (\underline{Y} - \underline{\underline{X}} \cdot \underline{\hat{a}}) = \frac{1}{2} \cdot (\underline{Y}^T \cdot \underline{Y} - 2 \cdot \underline{\hat{a}} \cdot \underline{\underline{X}}^T \cdot \underline{Y} + \underline{\hat{a}}^T \cdot \underline{\underline{X}}^T \cdot \underline{\underline{X}} \cdot \underline{\hat{a}})$$

$$\underline{Y} = \begin{cases} [y_L \ \ldots \ y_I \ y_I \ \ldots \ y_R]^T, & \to 2 \text{ segments} \\ [y_L \ \ldots \ y_I \ y_I \ \ldots \ y_{II} \ y_{II} \ \ldots \ y_R]^T, & \to 3 \text{ segments} \\ [y_L \ \ldots \ y_I \ y_I \ \ldots \ y_{II} \ y_{II} \ \ldots \ y_{III} \ y_{III} \ \ldots \ y_R]^T, & \to 4 \text{ segments} \end{cases}$$

$$\underline{\hat{a}} = \begin{cases} [\hat{a}_{10} \ \hat{a}_{11} \ \hat{a}_{12} \ \hat{a}_{13} \ \hat{a}_{20} \ \hat{a}_{21} \ \hat{a}_{22} \ \hat{a}_{23}]^T, & \to 2 \text{ segments} \\ [\hat{a}_{10} \ \hat{a}_{11} \ \hat{a}_{12} \ \hat{a}_{13} \ \hat{a}_{20} \ \hat{a}_{21} \ \hat{a}_{22} \ \hat{a}_{23} \ \hat{a}_{30} \ \hat{a}_{31} \ \hat{a}_{32} \ \hat{a}_{33}]^T, & \to 3 \text{ segments} \\ [\hat{a}_{10} \ \hat{a}_{11} \ \hat{a}_{12} \ \hat{a}_{13} \ \hat{a}_{20} \ \hat{a}_{21} \ \hat{a}_{22} \ \hat{a}_{23} \ \hat{a}_{30} \ \hat{a}_{31} \ \hat{a}_{32} \ \hat{a}_{33} \ \hat{a}_{40} \ \hat{a}_{41} \ \hat{a}_{42} \ \hat{a}_{43}]^T, & \to 4 \text{ segments} \end{cases}$$

$$\underline{\underline{X}} = \begin{cases} \begin{bmatrix} 1 & x_L & x_L^2 & x_L^3 & 0 & 0 & 0 & 0 \\ \vdots & \vdots & \vdots & \vdots & \vdots & \vdots & \vdots & \vdots \\ 1 & x_I & x_I^2 & x_I^3 & 0 & 0 & 0 & 0 \\ 0 & 0 & 0 & 0 & 1 & x_I & x_I^2 & x_I^3 \\ \vdots & \vdots & \vdots & \vdots & \vdots & \vdots & \vdots & \vdots \\ 0 & 0 & 0 & 0 & 1 & x_R & x_R^2 & x_R^3 \end{bmatrix}, & \to 2 \text{ segments} \\[2em] \begin{bmatrix} 1 & x_L & x_L^2 & x_L^3 & 0 & 0 & 0 & 0 & 0 & 0 & 0 & 0 \\ \vdots & \vdots & \vdots & \vdots & \vdots & \vdots & \vdots & \vdots & \vdots & \vdots & \vdots & \vdots \\ 1 & x_I & x_I^2 & x_I^3 & 0 & 0 & 0 & 0 & 0 & 0 & 0 & 0 \\ 0 & 0 & 0 & 0 & 1 & x_I & x_I^2 & x_I^3 & 0 & 0 & 0 & 0 \\ \vdots & \vdots & \vdots & \vdots & \vdots & \vdots & \vdots & \vdots & \vdots & \vdots & \vdots & \vdots \\ 0 & 0 & 0 & 0 & 1 & x_{II} & x_{II}^2 & x_{II}^3 & 0 & 0 & 0 & 0 \\ 0 & 0 & 0 & 0 & 0 & 0 & 0 & 0 & 1 & x_{II} & x_{II}^2 & x_{II}^3 \\ \vdots & \vdots & \vdots & \vdots & \vdots & \vdots & \vdots & \vdots & \vdots & \vdots & \vdots & \vdots \\ 0 & 0 & 0 & 0 & 0 & 0 & 0 & 0 & 1 & x_R & x_R^2 & x_R^3 \end{bmatrix}, & \to 3 \text{ segments} \\[2em] \begin{bmatrix} 1 & x_L & x_L^2 & x_L^3 & 0 & 0 & 0 & 0 & 0 & 0 & 0 & 0 & 0 & 0 & 0 & 0 \\ \vdots & \vdots & \vdots & \vdots & \vdots & \vdots & \vdots & \vdots & \vdots & \vdots & \vdots & \vdots & \vdots & \vdots & \vdots & \vdots \\ 1 & x_I & x_I^2 & x_I^3 & 0 & 0 & 0 & 0 & 0 & 0 & 0 & 0 & 0 & 0 & 0 & 0 \\ 0 & 0 & 0 & 0 & 1 & x_I & x_I^2 & x_I^3 & 0 & 0 & 0 & 0 & 0 & 0 & 0 & 0 \\ \vdots & \vdots & \vdots & \vdots & \vdots & \vdots & \vdots & \vdots & \vdots & \vdots & \vdots & \vdots & \vdots & \vdots & \vdots & \vdots \\ 0 & 0 & 0 & 0 & 1 & x_{II} & x_{II}^2 & x_{II}^3 & 0 & 0 & 0 & 0 & 0 & 0 & 0 & 0 \\ 0 & 0 & 0 & 0 & 0 & 0 & 0 & 0 & 1 & x_{II} & x_{II}^2 & x_{II}^3 & 0 & 0 & 0 & 0 \\ \vdots & \vdots & \vdots & \vdots & \vdots & \vdots & \vdots & \vdots & \vdots & \vdots & \vdots & \vdots & \vdots & \vdots & \vdots & \vdots \\ 0 & 0 & 0 & 0 & 0 & 0 & 0 & 0 & 1 & x_{III} & x_{III}^2 & x_{III}^3 & 0 & 0 & 0 & 0 \\ 0 & 0 & 0 & 0 & 0 & 0 & 0 & 0 & 0 & 0 & 0 & 0 & 1 & x_{III} & x_{III}^2 & x_{III}^3 \\ \vdots & \vdots & \vdots & \vdots & \vdots & \vdots & \vdots & \vdots & \vdots & \vdots & \vdots & \vdots & \vdots & \vdots & \vdots & \vdots \\ 0 & 0 & 0 & 0 & 0 & 0 & 0 & 0 & 0 & 0 & 0 & 0 & 1 & x_R & x_R^2 & x_R^3 \end{bmatrix}, & \to 4 \text{ segments} \end{cases}$$

-continued $$C = \begin{cases} \begin{bmatrix} 1 & x_I & x_I^2 & x_I^3 & -1 & -x_I & -x_I^2 & -x_I^3 \\ 0 & 1 & 2x_I & 3x_I^2 & 0 & -1 & -2x_I & -3x_I^2 \end{bmatrix}, & \to 2 \text{ segments} \\[1em] \begin{bmatrix} 1 & x_I & x_I^2 & x_I^3 & -1 & -x_I & -x_I^2 & -x_I^3 & 0 & 0 & 0 & 0 \\ 0 & 1 & 2x_I & 3x_I^2 & 0 & -1 & -2x_I & -3x_I^2 & 0 & 0 & 0 & 0 \\ 0 & 0 & 0 & 0 & 1 & x_{II} & x_{II}^2 & x_{II}^3 & -1 & -x_{II} & -x_{II}^2 & -x_{II}^3 \\ 0 & 0 & 0 & 0 & 0 & 1 & 2x_{II} & 3x_{II}^2 & 0 & -1 & -2x_{II} & -3x_{II}^2 \end{bmatrix}, & \to 3 \text{ segments} \\[1em] \begin{bmatrix} 1 & x_I & x_I^2 & x_I^3 & -1 & -x_I & -x_I^2 & -x_I^3 & 0 & 0 & 0 & 0 & 0 & 0 \\ 0 & 1 & 2x_I & 3x_I^2 & 0 & -1 & -2x_I & -3x_I^2 & 0 & 0 & 0 & 0 & 0 & 0 \\ 0 & 0 & 0 & 0 & 1 & x_{II} & x_{II}^2 & x_{II}^3 & -1 & -x_{II} & -x_{II}^2 & -x_{II}^3 & 0 & 0 \\ 0 & 0 & 0 & 0 & 0 & 1 & 2x_{II} & 3x_{II}^2 & 0 & -1 & -2x_{II} & -3x_{II}^2 & 0 & 0 \\ 0 & 0 & 0 & 0 & 0 & 0 & 0 & 0 & 1 & x_{III} & x_{III}^2 & x_{III}^3 & -1 & -x_{III} & -x_{III}^2 & -x_{III}^3 \\ 0 & 0 & 0 & 0 & 0 & 0 & 0 & 0 & 0 & 1 & 2x_{III} & 3x_{III}^2 & 0 & -1 & -2x_{III} & -3x_{III}^2 \end{bmatrix}, & \to 4 \text{ segments} \end{cases}$$

Eq. (16)

$$\underline{d} = \begin{cases} [0 \ 0]^T, & \to 2 \text{ segments} \\ [0 \ 0 \ 0 \ 0]^T, & \to 3 \text{ segments} \\ [0 \ 0 \ 0 \ 0 \ 0 \ 0]^T, & \to 4 \text{ segments} \end{cases}$$

Eq. (17)

In order to solve the minimization problem in Eq. (11), the approach of Lagrange function with only equality constraint may be used. The Lagrange function is as follow:

$$L(\underline{\hat{a}}, \underline{\lambda}) = f(\underline{\hat{a}}) + \underline{\lambda}^T \cdot (\underline{C} \cdot \underline{\hat{a}} - \underline{d})$$

Eq. (18)

Eq. (18) is an equivalent representation of the problem given in Eq. (11) whose solution is the minimum of the Lagrange function. Since the Lagrange function is a convex quadratic function of $\underline{\hat{a}}$, the solution can be found from the optimality condition:

$$\frac{\partial L(\underline{\hat{a}}, \underline{\lambda})}{\partial \underline{\hat{a}}} = 0$$

Eq. (19)

$$\frac{\partial L(\underline{\hat{a}}, \underline{\lambda})}{\partial \underline{\lambda}} = 0$$

Eq. (20)

For the partial derivative of the Lagrange function with respect to the coefficients the following applies:

$$\frac{\partial L(\underline{\hat{a}}, \underline{\lambda})}{\partial \underline{\hat{a}}} = \frac{\partial f(\underline{\hat{a}},)}{\partial \underline{\hat{a}}} + \frac{\partial}{\partial \underline{\hat{a}}} \underline{\lambda}^T \cdot (\underline{C} \cdot \underline{\hat{a}} - \underline{d}) = \underline{X}^T \cdot \underline{X} \cdot \underline{\hat{a}} - \underline{X}^T \cdot \underline{Y} + \underline{C}^T \cdot \underline{\lambda}$$

Eq. (21)

For the partial derivative of the Lagrange function with respect to the coefficients the following applies:

$$\frac{\partial L(\underline{\hat{a}}, \underline{\lambda})}{\partial \underline{\lambda}} = \frac{\partial f(\underline{\hat{a}},)}{\partial \underline{\lambda}} + \frac{\partial}{\partial \underline{\lambda}} \underline{\lambda}^T \cdot (\underline{C} \cdot \underline{\hat{a}} - \underline{d}) = \underline{C} \cdot \underline{\hat{a}} - \underline{d}$$

Eq. (22)

Putting Eq. (19) and Eq. (20) together yields a square set of n+number of segments−1+p linear equations in variables $\underline{\hat{a}}, \underline{\lambda}$:

$$\begin{bmatrix} \underline{X}^T \cdot \underline{X} & \underline{C}^T \\ \underline{C} & \underline{0} \end{bmatrix} \cdot \begin{bmatrix} \underline{\hat{a}} \\ \underline{\lambda} \end{bmatrix} = \begin{bmatrix} \underline{X}^T \cdot \underline{Y} \\ \underline{d} \end{bmatrix}$$

Eq. (23)

where:
$\underline{Y}$ is a ([n+m−1]×1) vector of observations on the dependent variable,
$\underline{\hat{a}}$ is a ([4·m]×1) vector of unknown spline parameters that is to be estimated,
$\underline{X}$ is a ([n+m−1]×[4·m]) design matrix which contains the observation on 4·m independent variables for n observations,
$\underline{C}$ is a (p×[4·m]) equality matrix,
$\underline{d}$ is a (p×1) equality vector,
n is the number of data points,
m is the number of segments,
p= is the number of equality constraints.

The solution of Eq. (23) provides the desired solution of Eq. (11).

Calculation of the Curve Length Where the Curve is Represented by Discrete Points To sort the object tracks or the object clusters according to their respective lengths it is necessary to calculate those lengths. The calculation of the length depends on the number of points (measured positions). As such, three cases are defined, for example:

Case A: 0≤Number of Points≤1

The length of a set of points which contains maximum one point is by definition equal to zero.

Case B: 2≤Number of Points≤3

Figure 14:
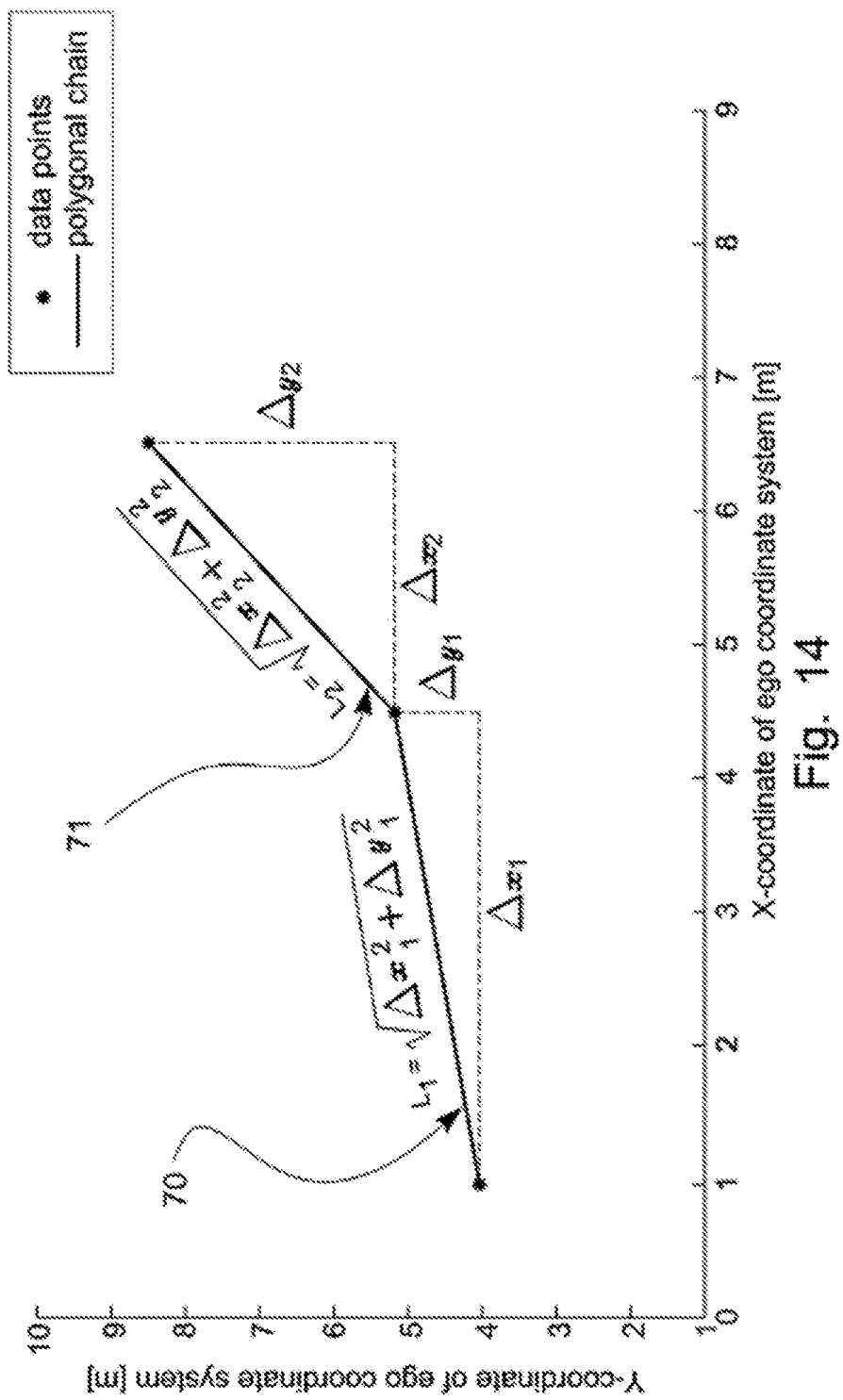
FIG. 14 is a plot illustrating calculating the length of an object track, which contains three position points with the corresponding x/y coordinates.

If the number of points is two or three, then the length is calculated by summing of the polygonal chain segment lengths, 70, 71, as illustrated in FIG. 14. The length of the data set (consisting of three points) is the sum of $L_1$ and $L_2$, as shown in FIG. 14.

Case C: Number of Points>3

In case of more than three points, first a polynomial spline is fitted (as above), potentially to each of a plurality of segments. Then for every segment which is modelled as a polynomial $$p_i(x) = a_0 + a_1 \cdot x + a_2 \cdot x^2 + a_3 \cdot x^3 \, \forall x_L \leq x \leq x_R$$

Eq. (24)

the segment length is calculated as follows:

$$L_i(p_i) = \int_{x_L}^{x_R} \sqrt{1 + \left(\frac{dp_i(x)}{dx}\right)^2} \cdot dx = \int_{x_L}^{x_R} \sqrt{1 + (a_1 + 2 \cdot a_2 \cdot x + 3 \cdot a_3 \cdot x^2)^2} \cdot dx \qquad \text{Eq. (25)}$$

Finally, the length of all points is determined by summing of the individual segment lengths.

$$L = \sum_{i=1}^{m} L_i(p_i), \text{ where } m \text{ is number of segments} \qquad \text{Eq. (26)}$$

Coordinate Transformation

Figure 15:
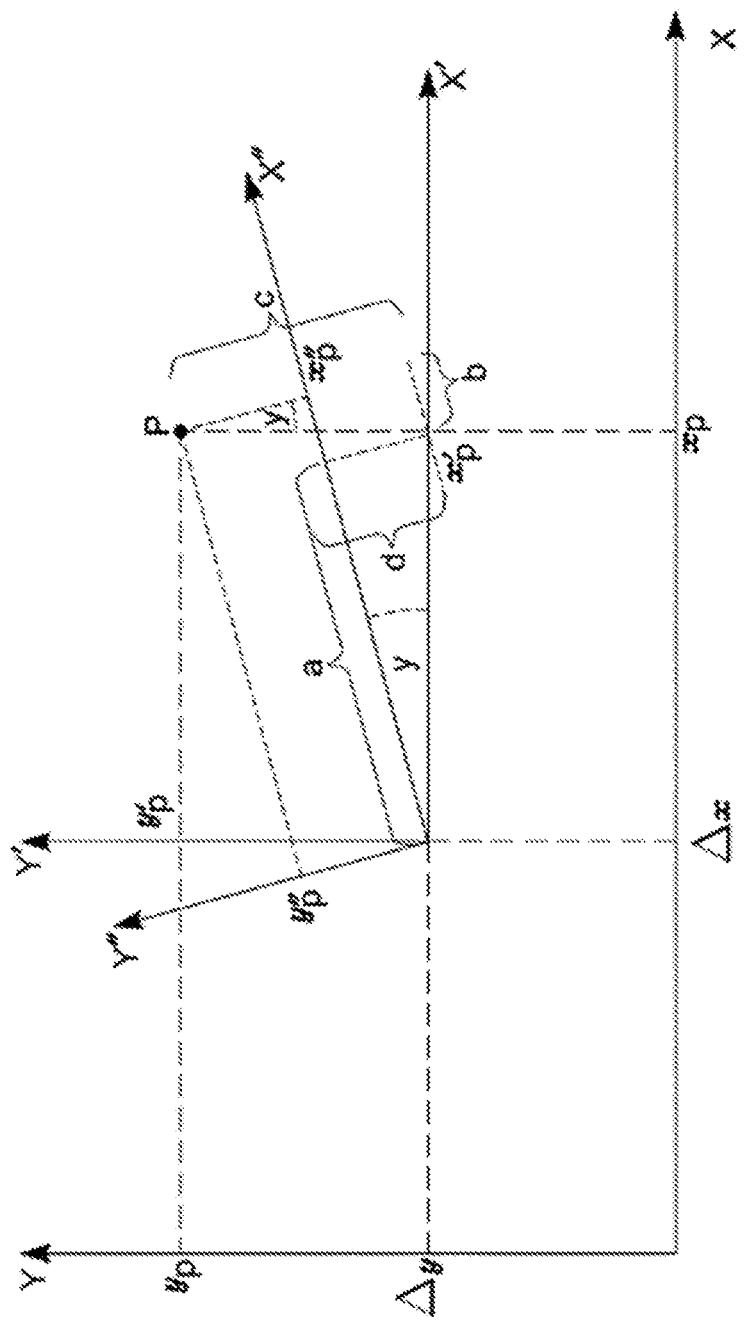
FIG. 15 is a plot illustrating the coordinate transformation in Cartesian coordinate system.

An example to demonstrate coordinate transformation is showed in FIG. 15. The coordinate transformation of the point P from xy-coordinate system into x"y"-coordinate system is derived as follows:

$x'_P = x_P - \Delta x$ $y'_P = y_P - \Delta y$ $x''_P = a + b \quad y''_P = c - d$ $a = x'_P \cdot \cos \gamma \quad c = y'_P \cdot \cos \gamma$ $b = y'_P \cdot \sin \gamma \quad d = x'_P \cdot \sin \gamma$ $x''_P = x'_P \cdot \cos \gamma + y'_P \cdot \sin \gamma = \cos \gamma \cdot (x_P - dx) + \sin \gamma \cdot (y_P - dy)$ Eq. (27)

$y''_P = -x'_P \cdot \sin \gamma + y'_P \cdot \cos \gamma = -\sin \gamma \cdot (x_P - dx) + \cos \gamma \cdot (y_P - dy)$ Eq. (28)

Eq. (27) and Eq. (28) can also be expressed in matrix notation:

$$\begin{bmatrix} x''_P \\ y''_P \end{bmatrix} = \begin{bmatrix} \cos \gamma & \sin \gamma \\ -\sin \gamma & \cos \gamma \end{bmatrix} \cdot \begin{bmatrix} (x_P - dx) \\ (y_P - dy) \end{bmatrix} \qquad \text{Eq. (29)}$$

Calculation of the Distance Between a Point and a Spline

In order to calculate the distance between a point and a spline it is necessary to determine those segments (or segment) of the spline against which the distance must be calculated. Hence, for each segment, two coordinate systems are created:

$x_1/y_1$: a coordinate system at the beginning of the segment where the $x_1$-axis is the tangent of the polynomial segment at its beginning.

$x_2/y_2$: a coordinate system at the end of the segment where the $x_2$-axis is the tangent of the polynomial segment at its end.

Figure 16:
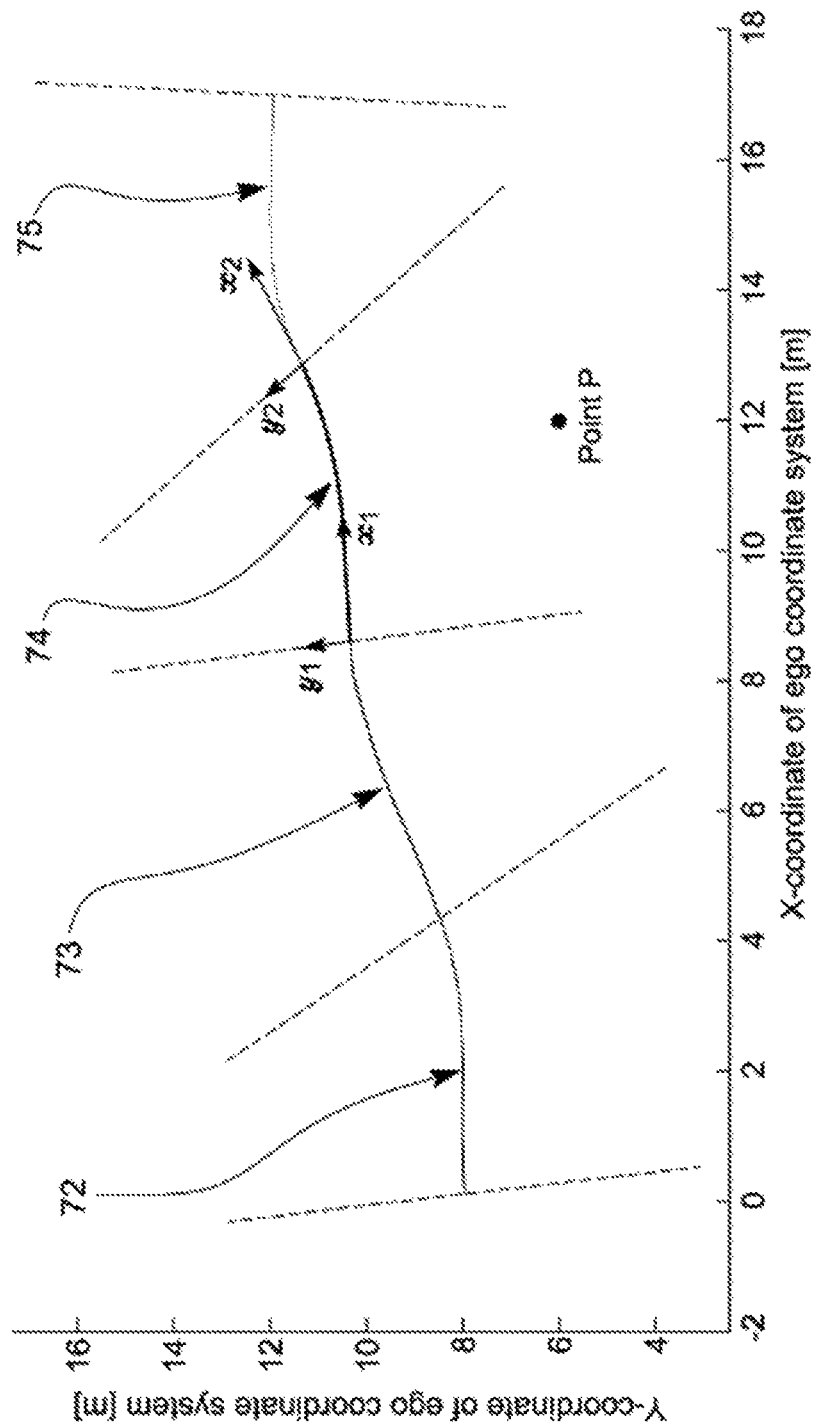
FIG. 16 is a plot illustrating identifying the section of a spline for calculating the lateral/perpendicular distance.

These coordinate systems are illustrated in FIG. 16. First, second, third and fourth segments 72, 73, 74, 75 of the spline are shown. The point in question, point P, is shown.

The coordinates of the point P in question are transformed once into $x_1/y_1$-coordinate system and once into $x_2/y_2$-coordinate-system. If the x-coordinate of the point in $x_1/y_1$-coordinate-system is greater than or equal to zero and in $x_2/y_2$-coordinate-system the x-coordinate is smaller than zero, then the corresponding segment represents those poly-nomial against which the distance will be calculated. In the example of FIG. 16, this is the third segment 74.

Figure 17:
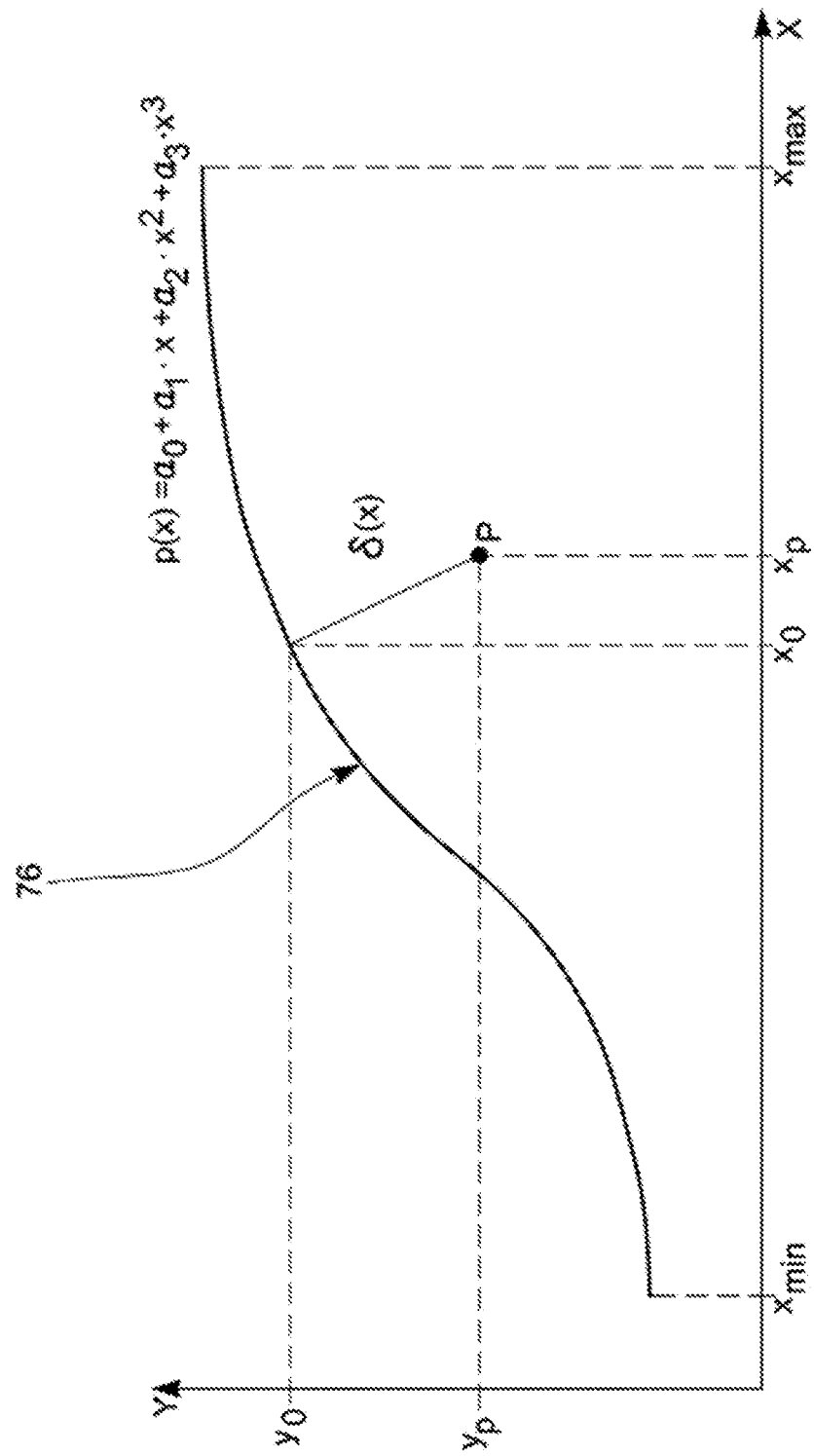
FIG. 17 is a plot illustrating a calculation of the shortest distance between a spline and a point.

The situation is illustrated in FIG. 17, in which the distance between a segment 76 of the spline and the point P is calculated. Consider that the segment 76 is represented by a cubic polynomial and a point as depicted in FIG. 17. The goal is to calculate the shortest distance δ between the cubic polynomial and the point P.

The distance δ can be expressed as a function depending on x as follows:

$$\delta^2(x) = (x - x_P)^2 + (y - y_P)^2 = (x - x_P)^2 + (p(x) - y_P)^2 \qquad \text{Eq. (30)}$$

To find the minimum δ, the derivative of Eq. (30) is set to zero:

$$\frac{d}{dx} \delta^2(x) = 0 \qquad \text{Eq. (31)}$$

where $$\frac{d}{dx} \delta(x)^2 \; 2 \cdot (x - x_P) + 2 \cdot (p(x) - y_P) \cdot \frac{d}{dx} p(x) = \qquad \text{Eq. (32)}$$
$$6 \cdot a_3^2 \cdot x^5 + 10 \cdot a_2 \cdot a_3 \cdot x^4 + (4 \cdot a_2^2 + 8 \cdot a_1 \cdot a_3) \cdot x^3 +$$
$$(6 \cdot a_0 \cdot a_3 + 6 \cdot a_1 \cdot a_2 - 6 \cdot a_3 \cdot y_P) \cdot x^2 +$$
$$(4 \cdot a_0 \cdot a_2 + 2 \cdot a_1^2 + 2 - 4 \cdot a_2 \cdot y_P) \cdot x +$$
$$(2 \cdot a_0 \cdot a_1 - 2 \cdot a_1 \cdot y_P - 2 \cdot x_P)$$

Solving Eq. (31) yields a set of complex and real roots $\underline{r} = (x_1 \; x_2 \; x_3 \; x_4 \; x_5)^T$. Now we consider only those roots which are real and lie in the interval between $x_{min}$ and $x_{max}$.

$\underline{r}_{reduced} = \underline{r}$ where $x_i \notin \mathbb{C} \wedge x_{min} \leq x_i \leq x_{max} \forall i = 1, \ldots, 5$ Now, we seek for those roots $x_0$ within reduced roots $\underline{r}_{reduced}$ so that it yields a minimum when inserted into Eq. (30). Therefore, the distance between the point $P(x_P/y_P)$ and the polynomial p(x) is $$\delta(x_0) = \sqrt{(x_0 - x_P)^2 + (p(x_0) - y_P)^2} \qquad \text{Eq. (33)}$$

Checking Confluence and Contact of Two Clusters

Given two object clusters, the following naming convention is used: Cluster 1 (also called as reference cluster) is the object cluster with the longest length and the other cluster is Cluster 2.

Figure 18:
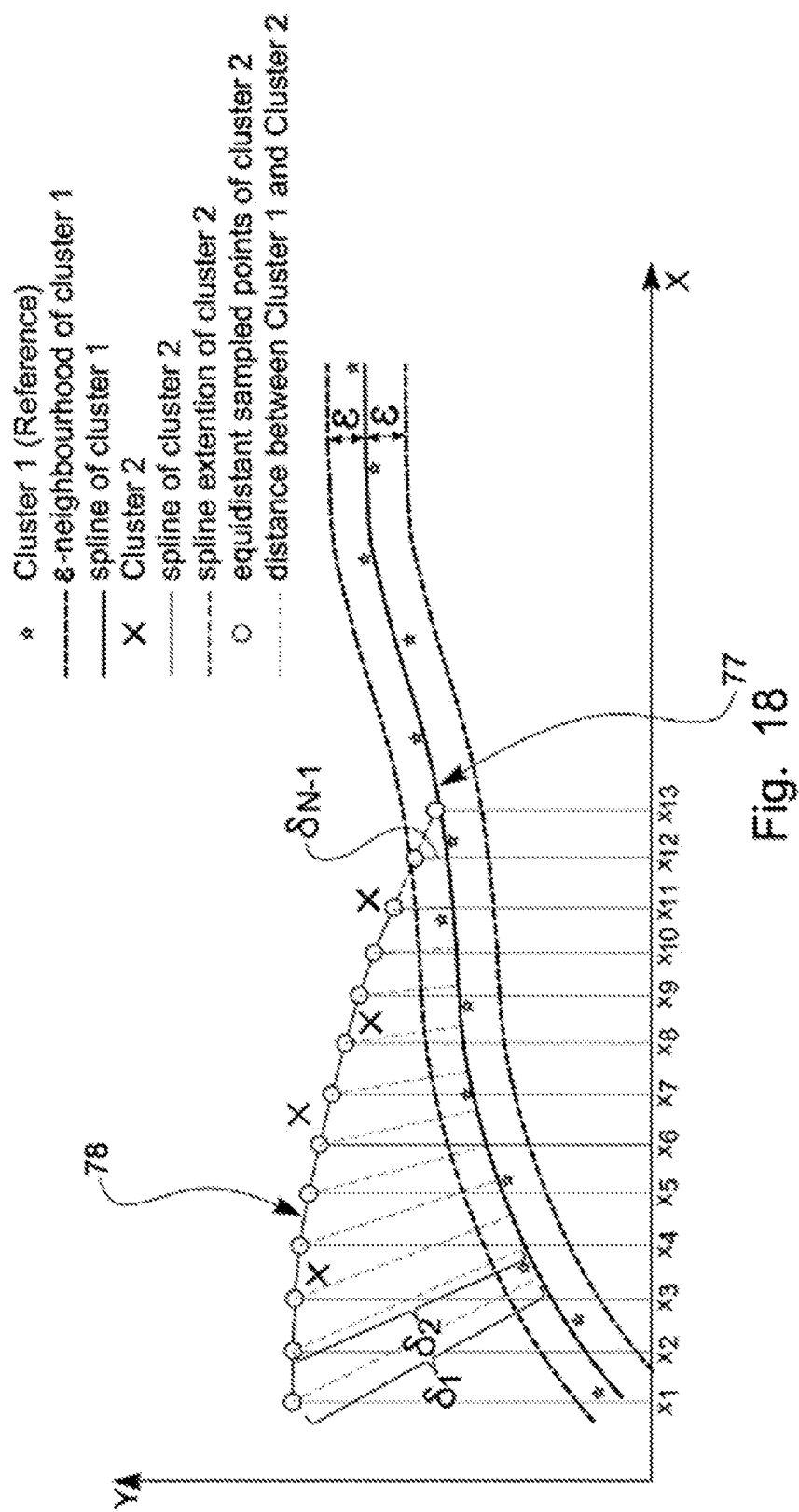
FIG. 18 is a plot illustrating confluence and contact of object tracks.

FIG. 18 illustrates the process of calculating confluence and contact of two object clusters.

First, two splines 77, 78 are fitted based on Cluster 1 and Cluster 2, respectively. The second spline 78 of Cluster 2 is extended on the right side by linear extrapolation (as shown in FIG. 18). The extrapolation of the second spline 78 is necessary in cases where Cluster 2 has not yet reached the neighbourhood of Cluster 1 but according to its tendency it will reach the neighbourhood of Cluster 1 in the near future. For example, the length of the extrapolation may correspond to 5 metres. Second, the whole range of the second spline 78 including the extension is equidistantly discretized into a series of sample points. Then, the distance between every sample point of Cluster 2 and the first spline 77 of Cluster 1 is calculated and entered in a table as in Table 10 (see below). Next, based on the results in Table 10 a distance spline is fitted. The distance spline is a spline fitted to the distances to Cluster 1 as a function of the x-coordinate of Cluster 2 (as exemplified in Table 10).

TABLE 10

| x-coordinate of Cluster 2 | distance to Cluster 1 |
|---|---|
| $x_1$ | $\delta_1$ |
| $x_2$ | $\delta_2$ |
| ... | ... |
| $x_N$ | $\delta_N$ |

The two splines may be said to be in contact with one another if the distance between them is smaller than or equal to a threshold ε. Two splines may be the to be confluent if they are in contact and the first derivative of the distance spline at $x_C$ is not positive where $x_C$ is the x-coordinate where distance spline is equal to the threshold ε. This can be expressed mathematically as follows:

At the real roots $\underline{r}=[x_{C1} \ldots x_{Cm}]^T$ of the equation $$\delta(x)=\varepsilon \qquad \text{Eq. (34)}$$

the object clusters are in contact. If there are no real roots, the object clusters are not in contact with each other.

If the solution of Eq. (34) contains real roots and the inequality $$\left.\frac{d}{dx}\delta(x)\right|_{x=x_{Ci}} < 0, \text{ where } i = 1, \ldots, m \qquad \text{Eq. (35)}$$

is satisfied at least for one real root, then the clusters are confluent.

Parallelism of Two Clusters

In geometry, two lines are the to be parallel if they are in a plane and do not intersect or touch each other at any point. Since the object clusters include the points (corresponding to measured positions), the geometric approach used for lines is not simply applied to the parallelism of the object clusters. Accordingly, the following example methodology may be used for the parallelism of a pair of object clusters.

First, for each of two object clusters a spline is fitted. Next, the shortest spline is resampled at equidistant x-coordinates, forming a series of sample points along the shortest spline. Then, for every sample point of the shortest spline the shortest distance to the longest spline is calculated. The maximum and minimum of those shortest distances are calculated. The difference between the maximum and minimum of all those distances is calculated. If the value of the difference is smaller than or equal to a predetermined threshold, then the two object clusters in question may be parallel with each other, otherwise they may not be parallel with each other.

Determine if a Cluster is Inner or External Cluster

An object cluster $C_R$ that has at least one other object cluster $C_i$ on its left side and at least one other object cluster on its right side may be defined to be an inner cluster. An external object cluster has at least one side (i.e. left or ride side) on which no other object clusters are located. The below methodology provides an example for determining whether a particular object cluster is inner cluster or an external cluster.

First, fit a cubic spline based on cluster $C_R$, where $C_R$ is the particular object cluster that is to be checked if it is inner or external cluster. Second, iterate over all other clusters $C_i$ where i≠R in the cluster object collection. For each other cluster $C_i$, transform its coordinates into the coordinate system of $C_R$. The coordinate system of $C_R$ slides over the spline of $C_R$ and has the same orientation as the tangent of the spline at the point where the origin of $C_R$-coordinate system is located (see FIG. 19). Finally, check the sign of transformed y-coordinates of points of every cluster $C_i$ where i≠R and $x_{Transformed}$≤h. If the values of the transformed y-coordinates of all other object clusters include both positive and negative values, then the Cluster $C_R$ is an inner cluster, otherwise the cluster $C_R$ is an external cluster.

Figure 19:
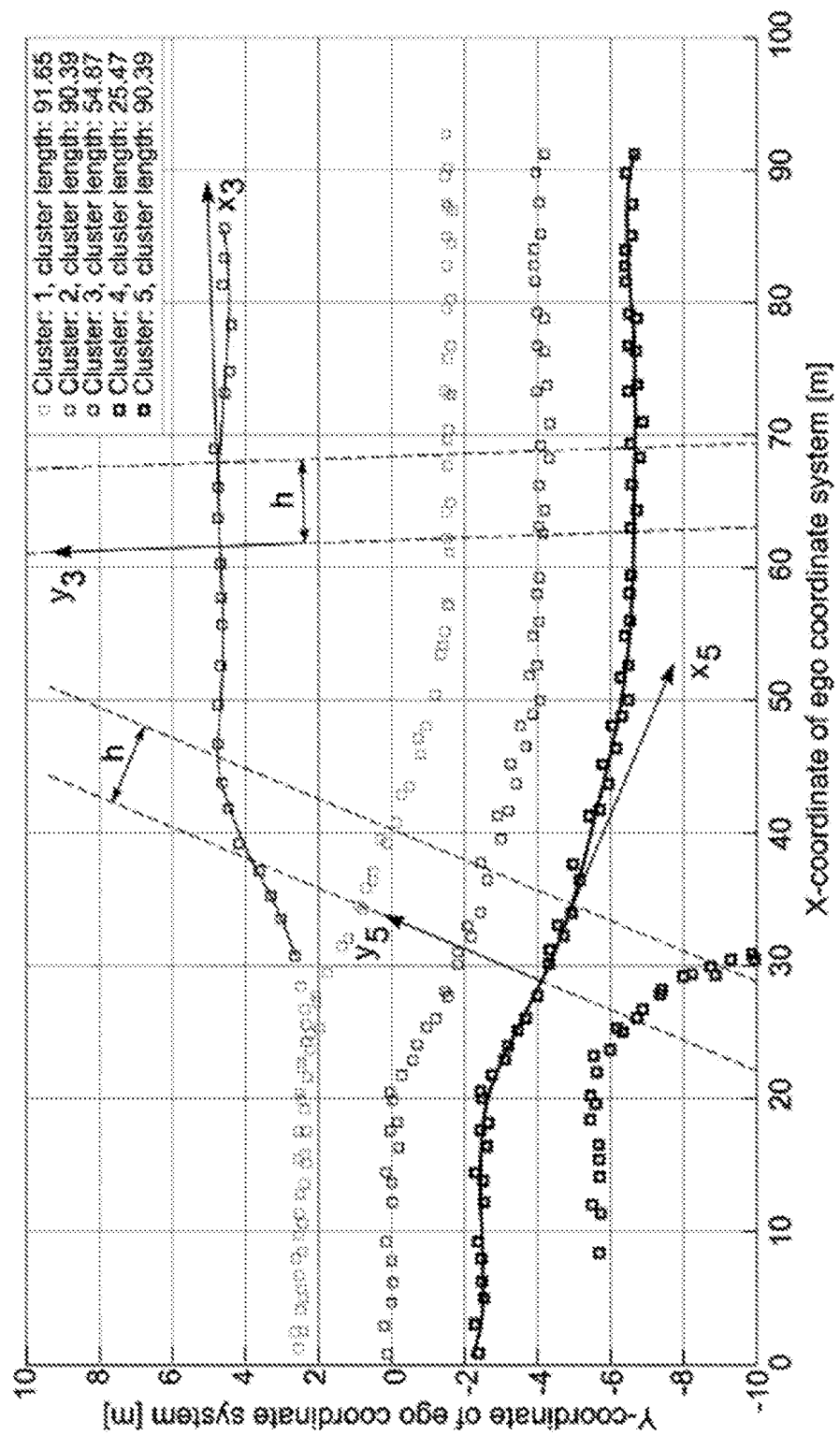
FIG. 19 is a plot illustrating inner and external object clusters.

Five object clusters as exemplarily depicted in FIG. 19. Considering Cluster 3 as the object cluster in question, the y-coordinate of every point $P_k(x \leq h, y) \in C_i$, where i=1, 2, 4, 5 which is transformed into the $x_3/y_3$-coordinate system, is negative. Thus, Cluster 3 is identified as an external cluster.

Considering Cluster 5 as the object cluster in question, and applying the same transformation on $P_k(x \leq h, y) \in C_i$, where i=1, 2, 3, 4 into $x_5/y_5$-coordinate system, yields that the y-coordinate of every point $P_k \in C_i$ is positive for i=1, 2, 3 and is negative at the same time for i=4. Thus, Cluster 5 is identified as an inner cluster.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

The invention claimed is:

1. An apparatus for a motor vehicle driver assistance system for a motor vehicle, the apparatus being operable to initialize and optimise a plurality of object clusters,
  each of the object clusters including at least one object track, wherein the object track includes a plurality of sequential measurements of a position of a respective object located in the vicinity of the motor vehicle, and the object track has a track length, the apparatus being configured to perform the following steps:
  a) assign the measurements of the positions of the plurality of object tracks to a collection of object clusters, wherein each of the object clusters include at least one position measurement from at least one of the object tracks;
  b) calculate a respective value of a first diagnostic for each of the object clusters in the collection;
  c) based on the values of the first diagnostic, identify a rogue object cluster;
  d) from the object tracks having the position measurements assigned to the rogue object cluster, identify as a rogue object track the object track having a longest length;

e) remove the sequence of position measurements corresponding to the rogue object track from all of the other object clusters;

f) reassign any remaining position of the measurements previously assigned to the rogue object cluster to other object clusters in the collection; and g) remove the rogue object cluster from the collection.

2. An apparatus according to claim 1, further configured to repeat the steps b) to g) until no rogue object cluster is identified.

3. An apparatus according to claim 1 further configured to, in the step b), determine whether or not each of the object clusters is confluent with each other of the object clusters.

4. An apparatus according to claim 1 further configured to determine, for each of the object clusters in the collection, whether the object cluster is an inner object cluster or an external object cluster.

5. An apparatus according to claim 4 wherein the value of the first diagnostic for the inner object cluster is the number of other of the inner object clusters with which it is confluent, and; wherein the value of the first diagnostic for the external object cluster is set to zero.

6. An apparatus according to claim 1 wherein the rogue object cluster is the object cluster having a highest unique value of the first diagnostic.

7. An apparatus according to claim 1 further configured to, in the event that two of the object clusters have identical values of the first diagnostic, calculate a value for a second diagnostic for at least the object clusters having the identical value of the first diagnostic, and wherein the identification of the rogue object cluster is further based on the value of the second diagnostic.

8. An apparatus according to claim 7 wherein the value of the second diagnostic for the object cluster is equal to a number of contacts of the object cluster with the other of the object clusters.

9. An apparatus according to claim 8 wherein the rogue object cluster is identified as the object cluster having the highest unique value of the second diagnostic.

10. An apparatus according to claim 9 further configured to, in the event that two of the object clusters have identical values of the second diagnostic, calculate a value for a third diagnostic for at least the object clusters having the identical value of the second diagnostic, and wherein the identification of the rogue object cluster is further based on the value of the third diagnostic.

11. An apparatus according to claim 10 wherein a value of the third diagnostic for the object cluster is equal to the number of parallelisms of it with the other object clusters.

12. An apparatus according to claim 11 wherein the rogue object cluster is identified as the object cluster having the lowest unique value of the third diagnostic.

13. A method for a motor vehicle driver assistance system for a motor vehicle, the method for initialising and optimising a plurality of object clusters, wherein each of the object clusters including at least one object track, wherein each of the object clusters include a plurality of sequential measurements of a position of a respective object located in the vicinity of the motor vehicle, and each of the object tracks has a track length, the method including the following steps:

a) assign a position measurements of the plurality of object tracks among a collection of the object clusters, wherein each of the object clusters include at least one position measurement from at least one of the object tracks;

b) calculate a respective value of a first diagnostic for each of the object clusters in the collection;

c) based on the values of the first diagnostic, identify a rogue object cluster;

d) from the object tracks whose position measurements are assigned to the rogue object cluster, identify as a rogue object track the object track having a longest length;

e) remove the sequence of position measurements corresponding to the rogue object track from all other of the object clusters;

f) reassign any remaining position measurements in the rogue object cluster to the other object clusters in the collection, and;

g) remove the rogue object cluster from the collection.

14. A method according to claim 13, further comprising repeating the steps b) to g) until no rogue object cluster is identified.

15. A method according to claim 13, further comprising in the step b), determining whether or not each of the object clusters is confluent with each other of the object clusters.

16. A method according to claim 13, further comprising, determining, for each of the object clusters in the collection, whether the object cluster is an inner object cluster or an external object cluster.

17. A method according to claim 16, wherein:
the value of the first diagnostic for the inner object cluster is the number of other of the inner object clusters with which it is confluent, and;
wherein the value of the first diagnostic for the external object cluster is set to zero.

18. A method according to claim 13, wherein the rogue object cluster is the object cluster having a highest unique value of the first diagnostic.

19. A method according to claim 13, further comprising, in the event that two of the object clusters have identical values of the first diagnostic, calculating a value for a second diagnostic for at least the object clusters having the identical value of the first diagnostic, and wherein the identification of the rogue object cluster is further based on the value of the second diagnostic.

20. A method according to claim 19, wherein the value of the second diagnostic for the object cluster is equal to a number of contacts of the object cluster with the other of the object clusters.

* * * * *